(12) United States Patent
Jang et al.

(10) Patent No.: US 6,392,902 B1
(45) Date of Patent: *May 21, 2002

(54) SOFT-SWITCHED FULL-BRIDGE CONVERTER

(75) Inventors: Yungtaek Jang, Apex; Milan M. Jovanovic, Cary, both of NC (US)

(73) Assignee: Delta Electronics, Inc., Neihu (TW)

(*) Notice: Subject to any disclaimer, the term of this patent is extended or adjusted under 35 U.S.C. 154(b) by 0 days.

This patent is subject to a terminal disclaimer.

(21) Appl. No.: 09/652,869

(22) Filed: Aug. 31, 2000

(51) Int. Cl.[7] .................... H02M 3/335; H02H 7/122
(52) U.S. Cl. .................... 363/17; 363/56.02; 363/132
(58) Field of Search ............... 363/16, 17, 49, 363/55, 56.02, 98, 132; 323/235, 247, 255, 238

(56) References Cited

U.S. PATENT DOCUMENTS

| | | | | |
|---|---|---|---|---|
| 4,527,228 A | * | 7/1985 | Chi Yu | 363/98 |
| 5,781,419 A | * | 7/1998 | Kutkut et al. | 363/17 |
| 5,986,905 A | * | 11/1999 | Cheng | 363/16 X |
| 6,016,258 A | * | 1/2000 | Jain et al. | 363/17 |
| 6,246,899 B1 | * | 6/2001 | Jang et al. | 363/132 |

* cited by examiner

*Primary Examiner*—Jessica Han
(74) *Attorney, Agent, or Firm*—Skjerven Morrill MacPherson LLP; Edward C. Kwok

(57) ABSTRACT

A soft-switched full-bridge pulse-width modulated ("FB PWM") converter includes a coupled inductor provides ZVS conditions over a wide range of input voltages and output loads. Further, the FB PWM converter of the present invention requires neither a large leakage inductance in the transformer, nor an external inductor, to achieve ZVS.

30 Claims, 21 Drawing Sheets

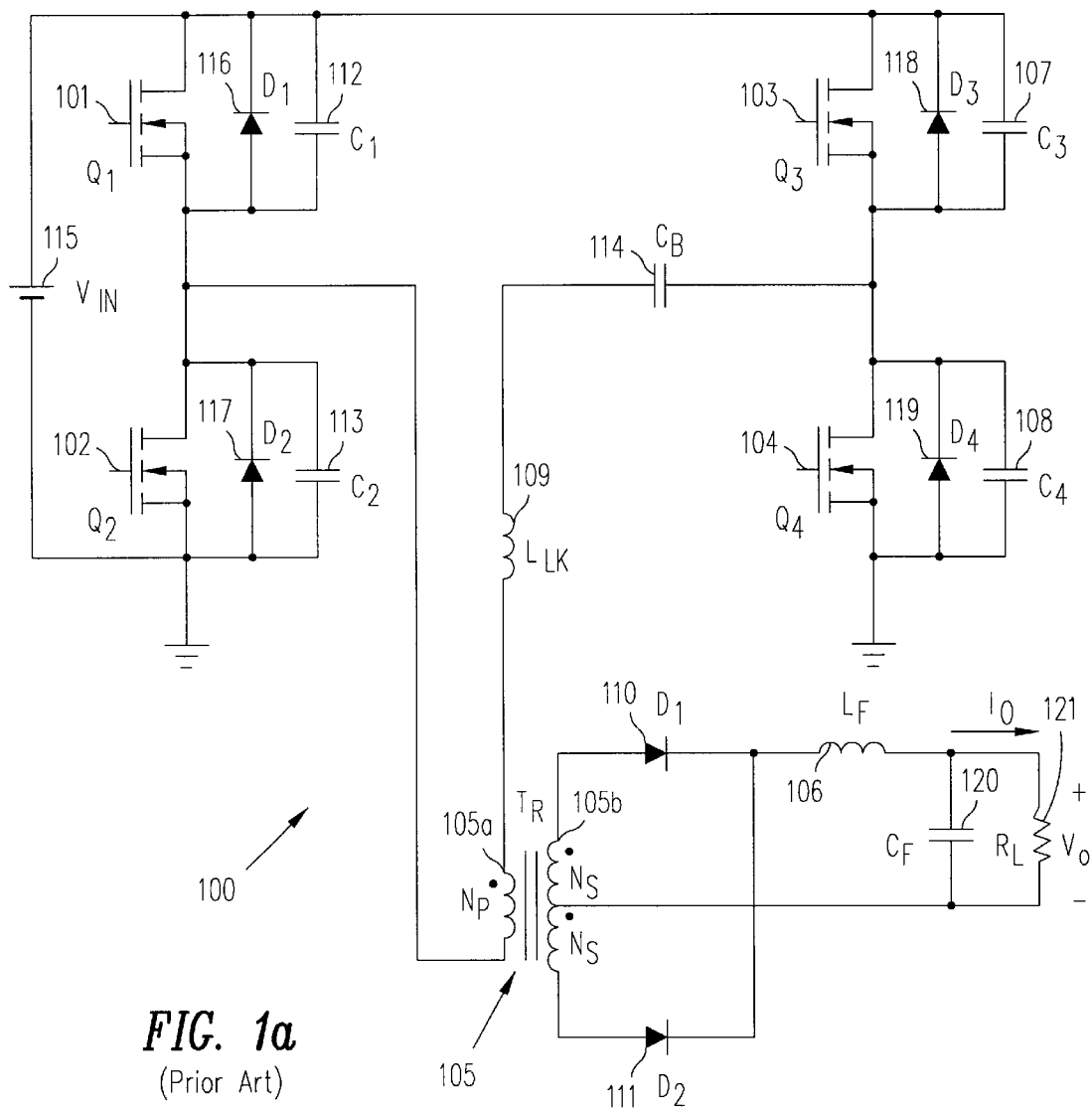
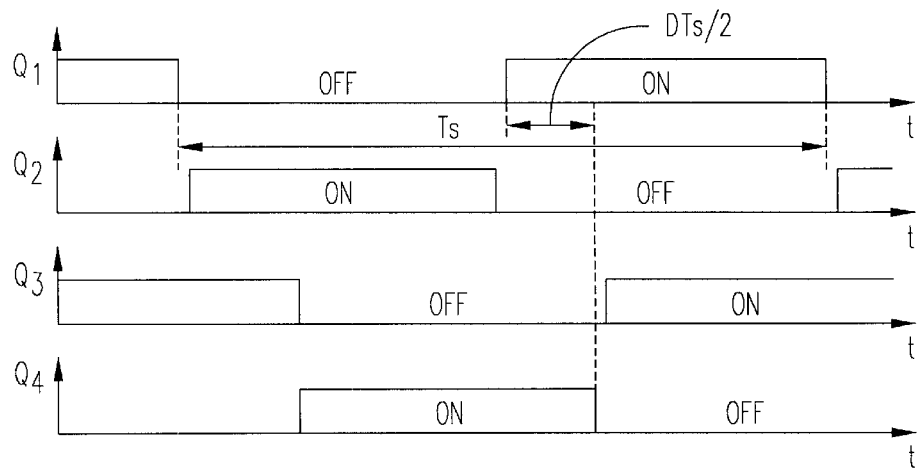
FIG. 1a
(Prior Art)
FIG. 1b
(Prior Art)

[T0–T1]

[T3-T4]

[T4-T5]

[T6-T7]

[T7-T8]

[T8-T9]

[T9-T10]

[T10-T11]

[T11-T12]

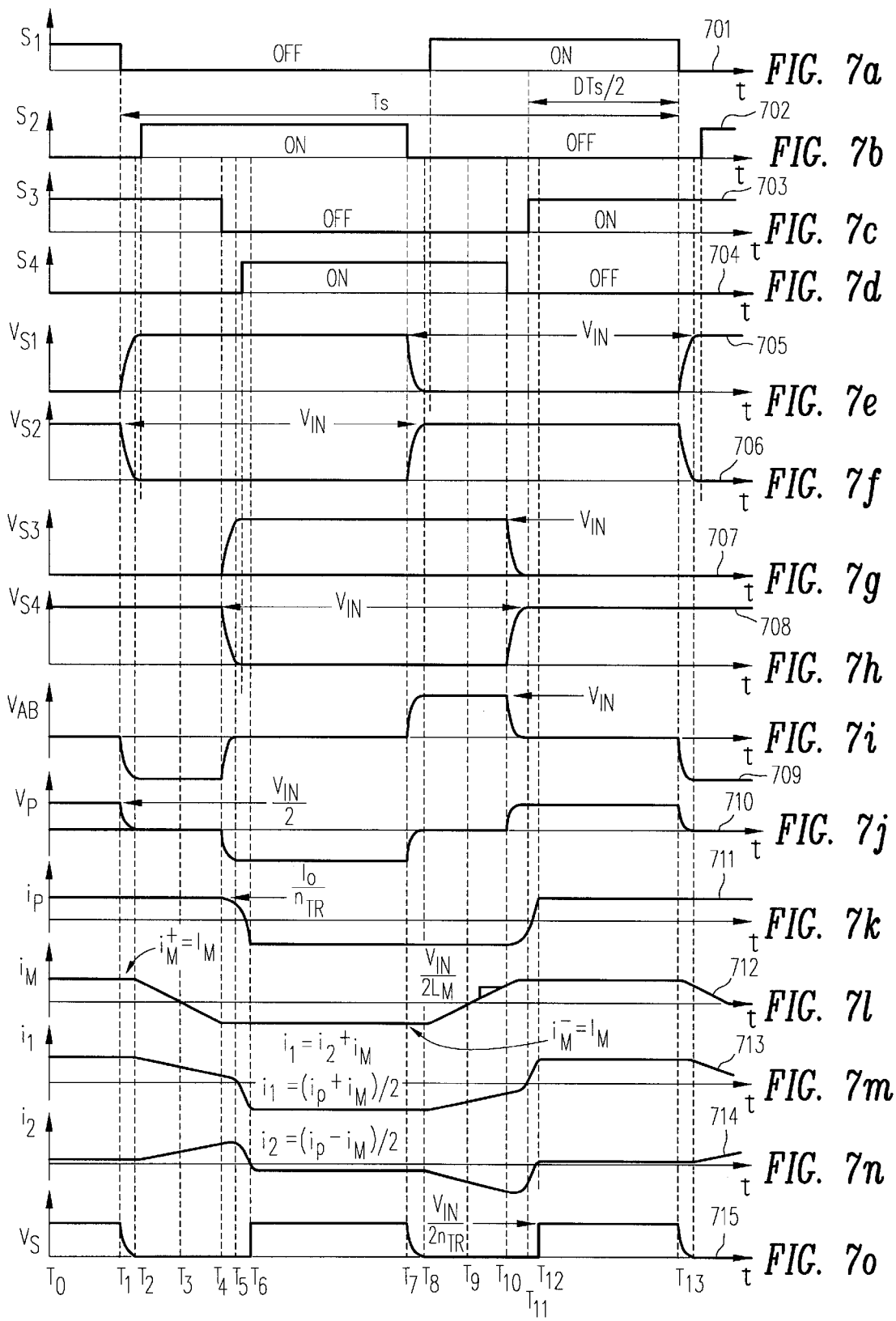

SOFT-SWITCHED FULL-BRIDGE CONVERTER

BACKGROUND OF THE INVENTION

1. Field of the Invention

This invention relates to an isolated dc/dc converter. More particularly, this invention relates to a constant-frequency, isolated dc/dc full-bridge converter that operates with zero-voltage switching of the primary switches.

2. Discussion of the Related Art

A factor adversely affecting the performance of a conventional "hard-switched" pulse-width-modulated (PWM) converter at a high switching frequency is circuit parasitics, such as semiconductor junction capacitances, transformer leakage inductances, and rectifier reverse recovery. Generally, these parasitics introduce additional switching losses and increase component stresses, thus limiting the converter's maximum operation frequency. To operate a converter at a high switching frequency and to achieve a high power density, elimination or a reduction of circuit parasitics without degrading conversion efficiency is required. One approach which incorporates circuit parasitics into circuit operations uses a resonant technique or a constant-frequency PWM soft-switching technique.

Under a resonant technique, a resonant tank circuit shapes the current or voltage waveforms of semiconductor switches in the converter to create either zero-current turn-off, or zero-voltage turn-on conditions. However, relative to conventional switching techniques, zero-current switching (ZCS) and zero-voltage switching (ZVS) in a resonant-type converter cause higher current or voltage stresses in the semiconductor switches. In addition, to create a ZCS or a ZVS condition, a resonant topology typically circulates a significant amount of energy. Thus, the trade-off between switching loss and conduction loss may result in a lower efficiency or a larger high-frequency resonant-type converter, when compared to a PWM counterpart operating at a lower frequency, especially in an application involving a wide input voltage range. In addition, variable frequency operation is often seen as a disadvantage of resonant converters. As a result, although resonant converters are used in a number of niche applications, such as those with pronounced parasitics, the resonant technique has not gained wide acceptance in the power supply industry in high-frequency, high-power-density applications.

To overcome the degradation of efficieny due to circuit parasitics, a number of techniques that enable a constant-frequency PWM converter to operate with ZVS or ZCS have been proposed. In such a soft-switching PWM converter—one that possess the PWM-like square current and voltage waveforms—lossless turn-off or turn-on of the switches can be achieved without a significant increase of conduction loss. One soft-switched PWM circuit is the soft-switched, full-bridge (FB) PWM converter 100 of FIG. 1(a), which is discussed in the article "Pseudo-Resonant Full Bridge DC/DC Converter," by O. D. Petterson, D. M. Divan, published in *IEEE Power Electronics Specialists' Conf: Rec.*, pp. 424–430, 1987, and in the article "Design Considerations for High-Voltage High-Power Full-Bridge Zero-Voltage-switched PWM Converter," by J. Sabate, et. al., published in *IEEE Applied Power Electronics Conf: (APEC) Proc.*, pp. 275–284, 1990. Converter 100 provides ZVS in the primary switches with relatively small circulating energy and at a constant switching frequency. A constant-frequency output voltage is achieved by a phase-shift technique. Under this technique, a switch in the lagging leg (i.e., switches 103 and 104) of the bridge is closed only after a delay (i.e., phase shifted) relative to the closing of a corresponding switch in the leading leg (i.e., switches 101 and 102), as shown in FIG. 1(b). Without the phase-shift, no voltage is applied across the primary winding 105a of transformer 105, resulting in a zero output voltage. However, if the phase-shift is 180°, the maximum volt-second product is applied across the primary winding 105a, which produces a maximum output voltage. In converter 100 of FIG. 1(a), a ZVS condition in the lagging-leg (i.e., switches 103 and 104) is achieved by the energy stored in output filter inductor 106. Since filter inductor 106 is relatively large, the energy stored in filter inductor 106 is sufficient to discharge output parasitic capacitances 107 and 108 of switches 103 and 104 to achieve the ZVS condition, even at a small load current. However, parasitic capacitances 112 and 113 of leading-leg switches 101 and 102 are discharged by energy stored in leakage inductance 109 of transformer 105. (During the switching of switches 101 and 102, primary winding 105a is shorted by rectifiers 110 and 111 carrying the output current of filter inductor 106.) Since leakage inductance 109 is small, switches 101 and 102 cannot achieve ZVS condition even at relatively high output currents. In the prior art, the ZVS range of leading-leg switches 101 and 102 is extended either by increasing leakage inductance 109, or by adding an external inductor in series with primary winding 105a. A properly sized external inductor can store enough energy to achieve ZVS condition in the leading-leg switches 101 and 102 even at low currents. However, a large external inductor would also store a large amount of energy at the full load, thus producing a large circulating energy adversely stressing the semiconductor components and reducing conversion efficiency. Further, in converter 100, severe parasitic ringing may occur in the secondary winding 105b of transformer 105 when one of rectifiers 110 and 111 turns off. Such ringing results from a resonance among the junction capacitance of the rectifier, leakage inductance 109 and the external inductor (when present). To control such ringing, a snubber circuit is required on the secondary side of transformer 105, thus significantly lowering the conversion efficiency of the circuit.

Alternatively, in the prior art, the ZVS range of switches 101 and 102 is extended to lower load currents without a significant increase of the circulating energy by using a saturable external inductor, as illustrated by full-bridge ZVS PWM converter 200 of FIG. 2. (In this discussion and in the detailed description below, to facilitate correspondence between figures, like elements are assigned like reference numerals). Converter 200 is described in the article, "An Improved Full-Bridge Zero-Voltage-Switched PWM Converter Using a Saturable Inductor," by G. Hua, F. C. Lee, M. M. Jovanovic, published *IEEE Power Electronics Specialists' Conf: Rec.*, pp. 189–194, 1991. When saturable inductor 209 is sufficiently large to saturate at a high load current, a controlled amount of energy is stored in saturable inductor 209. At the same time, at a low load current (i.e., when saturable inductor 209 is not saturated), saturable inductor 209 has a sufficiently high inductance to store enough energy to provide ZVS in switches 101 and 102 even at small loads. However, when placed in the primary side of transformer 201, saturable inductor 209 requires a relatively large magnetic core, thus increasing the cost of converter 200. (Generally, a large magnetic core is required to eliminate excessive heat resulting from core loss as the flux in a saturable inductor swings between the positive and negative saturation levels).

In the prior art, the ZVS range of a FB ZVS PWM converter is also extended to a lower load current by placing saturable inductors on the secondary side, as illustrated by FB ZVS PWM converter 300 of FIG. 3. As shown in FIG. 3, saturable inductors 309a and 309b are connected in series with rectifiers 110 and 111, so that the flux swing in each of saturable inductors 309a and 309b is confined between zero and a positive saturation level (i.e., the flux swing in each of saturable inductors 309a and 309b is approximately half the flux swing of saturable core 209 of FIG. 2.) As a result, core loss in converter 300 in FIG. 3 is reduced, as compared to converter 200 of FIG. 2. However, because in voltage step-down converters (i.e., converters with an output voltage $V_o$ smaller than input voltage $V_{in}$) secondary currents are larger than the primary current, the total copper loss of the windings of saturable inductors 309a and 309b is increased, when compared to the copper loss of the windings in saturable inductor 209. Secondary-side saturable inductors 309a and 309b serve as turn-off snubbers for rectifiers 110 and 111, thus damping the parasitic oscillations between the junction capacitance of rectifiers 110 and 111 and the leakage inductance of transformer 301, and reducing the reverse-recovery current losses when fast-recovery rectifiers are used.

In a FB ZVS PWM converter with secondary-side saturable inductors, such as converter 300, a freewheeling rectifier 302 may be used. With freewheeling diode 302, saturable inductors 309a and 309b store enough energy at lower load currents so that a ZVS condition for the primary switches is achieved with minimum circulating energy. Without freewheeling diode 302, saturable inductors 309a and 309b are not used for energy storage, as explained in U.S. Pat. No. 5,132,889,"Resonant-Transition DC-to-DC Converter," to L. J. Hitchcock, M. M. Walters, R. A. Wunderlich, issued on Jul. 21, 1992. Instead, saturable inductors 309a and 309b are used to briefly delay turning on the non-conducting one of rectifiers 110 and 111 after a corresponding switch in a bridge leg is opened, so that the current in filter inductor 106 continues to flow through the conducting one of rectifiers 110 and 111. As a result, in converter 300, the energy stored in filter inductor 106 creates a ZVS condition for switches 101 and 102 in the same way as it creates a ZVS condition for switches 103 and 104.

Finally, in a FB ZVS PWM converter, any inductance connected directly in series with the primary or secondary winding (or both) including the leakage inductance of the transformer, causes a loss of duty cycle at the secondary side of the transformer. The loss of duty cycle is detrimental to efficiency, since a lower duty cycle requires a reduced number of turns in the transformer, which increases both conduction loss in the primary side and voltage stresses in components of the secondary side. The loss of duty cycle results from the commutation time required for the primary current to change direction. Because, during the commutation time, the windings of the transformer are shorted by all the secondary side rectifiers simultaneously conducting, the commutation time, and therefore the duty cycle loss, is proportional to the total inductance connected in series with the transformer windings.

Because circuit 100 in FIG. 1 requires an increased leakage inductor or an external inductance (or both) in series with the transformer for ZVS, circuit 100 suffers from a large loss of duty cycle on the secondary side. Converter 200 of FIG. 2 and converter 300 of FIG. 3 have a smaller duty cycle loss, since they use saturable inductances, which reduces the effective commutation inductance. Generally, the optimal FB ZVS PWM converter should be able to achieve ZVS of primary switches without a need for external linear or saturable inductors, and with a minimum leakage inductance (preferably zero).

SUMMARY of the INVENTION

The present invention provides an isolated, constant-frequency, dc/dc FB ZVS PWM converter which employs a coupled inductor on the primary side of the transformer to achieve a ZVS condition for the switches in the full bridge over wide ranges of load currents and input voltages. A converter of the present invention has reduced circulating energy and conduction losses. In one embodiment, two windings of a coupled inductor are connected in series and their common terminal is connected to one end of the primary winding of a transformer (the other end of the primary winding is connected to ground). The other terminals of the coupled inductor are respectively connected to midpoints of two bridge legs through a corresponding blocking capacitor. The secondary side of such a converter can be implemented using a full-wave rectifier, such as a full-wave rectifier with a center-tap secondary winding, a full-wave rectifier with a current doubler, or a full-bridge full-wave rectifier. The output voltage regulation in the converter is achieved by employing a constant-frequency phase-shift control.

In a converter of the present invention, both the energy stored in an output filter inductor and the magnetizing inductance of the coupled inductor are used to discharge the parasitic capacitance across a switch to achieve a ZVS condition. Since the coupled inductor transfers current (hence, energy) from the winding in one bridge leg to the other bridge leg, a converter of the present invention opens all bridge switches when the switches carry currents of the same magnitude. As a result, the energy available for discharging the capacitances of each switch is the same for all primary switches.

According to another aspect of the present invention, a converter achieves ZVS conditions for all the primary switches, even in the absence of a load, by properly selecting a value for the magnetizing inductance of the coupled inductor. In a converter of the present invention, because energy is not stored in a leakage inductance, the transformer's leakage inductance can be minimized, thus significantly reducing the secondary-side ringing caused by a resonance between the leakage inductance and a junction capacitance of the rectifier. Power dissipation in a snubber circuit usually required to damp ringing is also reduced. Moreover, due to a minimized leakage inductance of the transformer, duty cycle loss on the secondary side of the transformer is also minimized. As a result, a converter of the present invention can operate with a very high duty cycle, thus minimizing both conduction loss in the primary switches and voltage stresses on the components of the secondary side, and achieving improved efficiency.

The present invention is better understood upon consideration of the detailed description below and the accompanying drawings.

BRIEF DESCRIPTION OF THE DRAWINGS

FIG. 1(a) shows conventional full-bridge ZVS PWM converter 100.

FIG. 1(b) is a gate signal timing-diagram of converter 100 of FIG. 1(a).

FIGS. 7(a) to 7(o) show the respective waveforms of selected signals during the switching cycle of FIGS. 6(a) to 6(l).

DETAILED DESCRIPTION OF THE PREFERRED EMBODIMENTS

Figure 4:
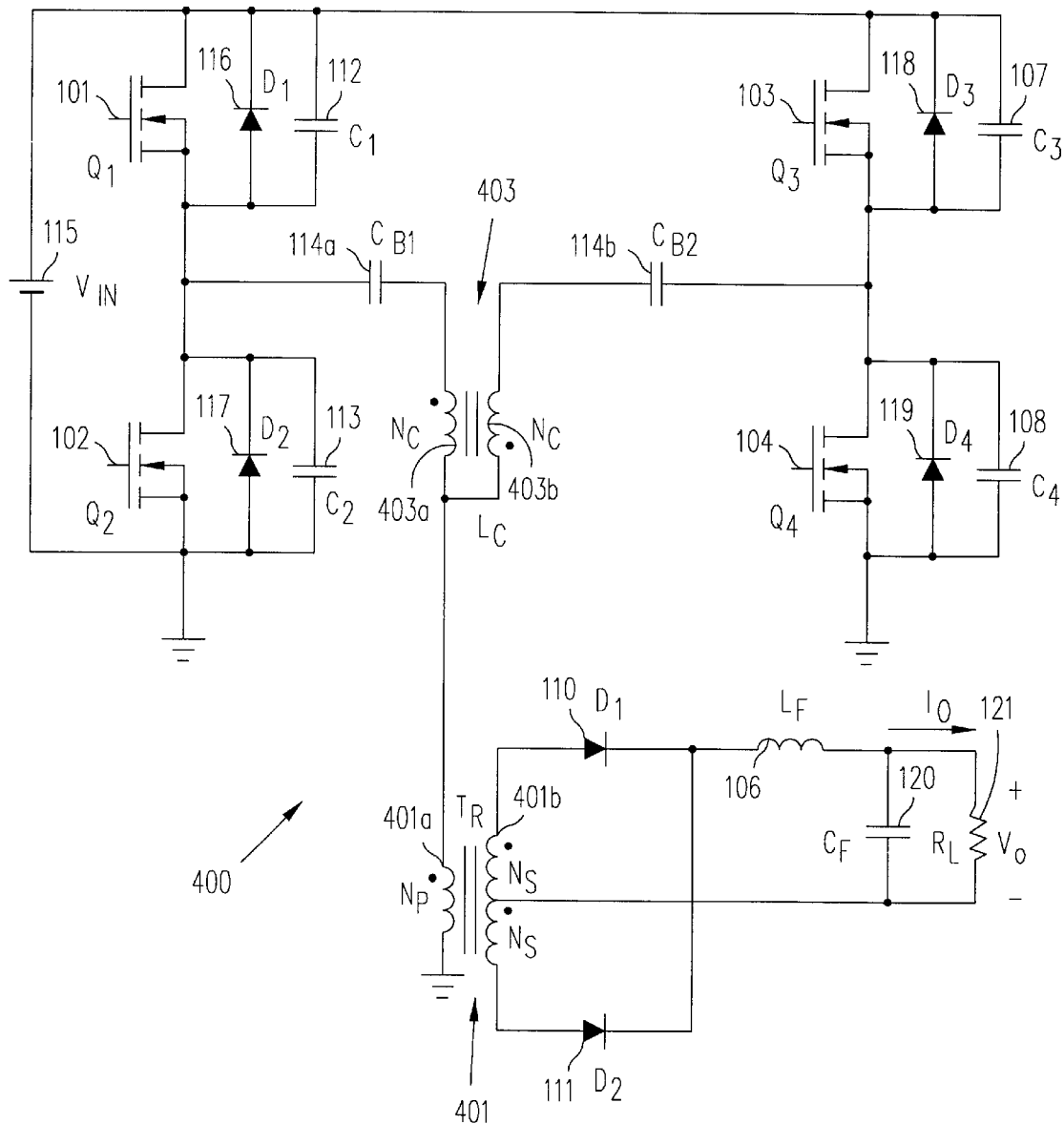
FIG. 4 shows isolated, dc/dc FB ZVS PWM converter 400, including coupled inductor 403 on the primary side of transformer 401, in accordance with the present invention.

FIG. 4 shows isolated, dc/dc FB ZVS PWM converter 400, including coupled inductor 403 on the primary side of transformer 401, in accordance with the present invention. Converter 400 achieves a ZVS condition in the primary switches 101–104 even at low load current conditions, with a minimum circulating energy and conduction loss. As shown in FIG. 4, switches 101–104 are connected through blocking capacitors 114a and 114b to coupled inductor 403 and transformer 401. Blocking capacitors 114a and 114b block DC current flow, thus preventing saturation of coupled inductor 403 and transformer 401. Capacitors 114a and 114b are selected to have large enough values so that their voltages are approximately constant during a switching cycle. To regulate the output voltage $V_o$ against a load change or an input voltage $V_{IN}$ change at a constant switching frequency, a phase-shift control circuit (not shown) is provided. In the embodiment shown in FIG. 4, the output side of converter 400 can be implemented by a full-wave rectifier with a center-tapped secondary coil 401b.

Figure 5:
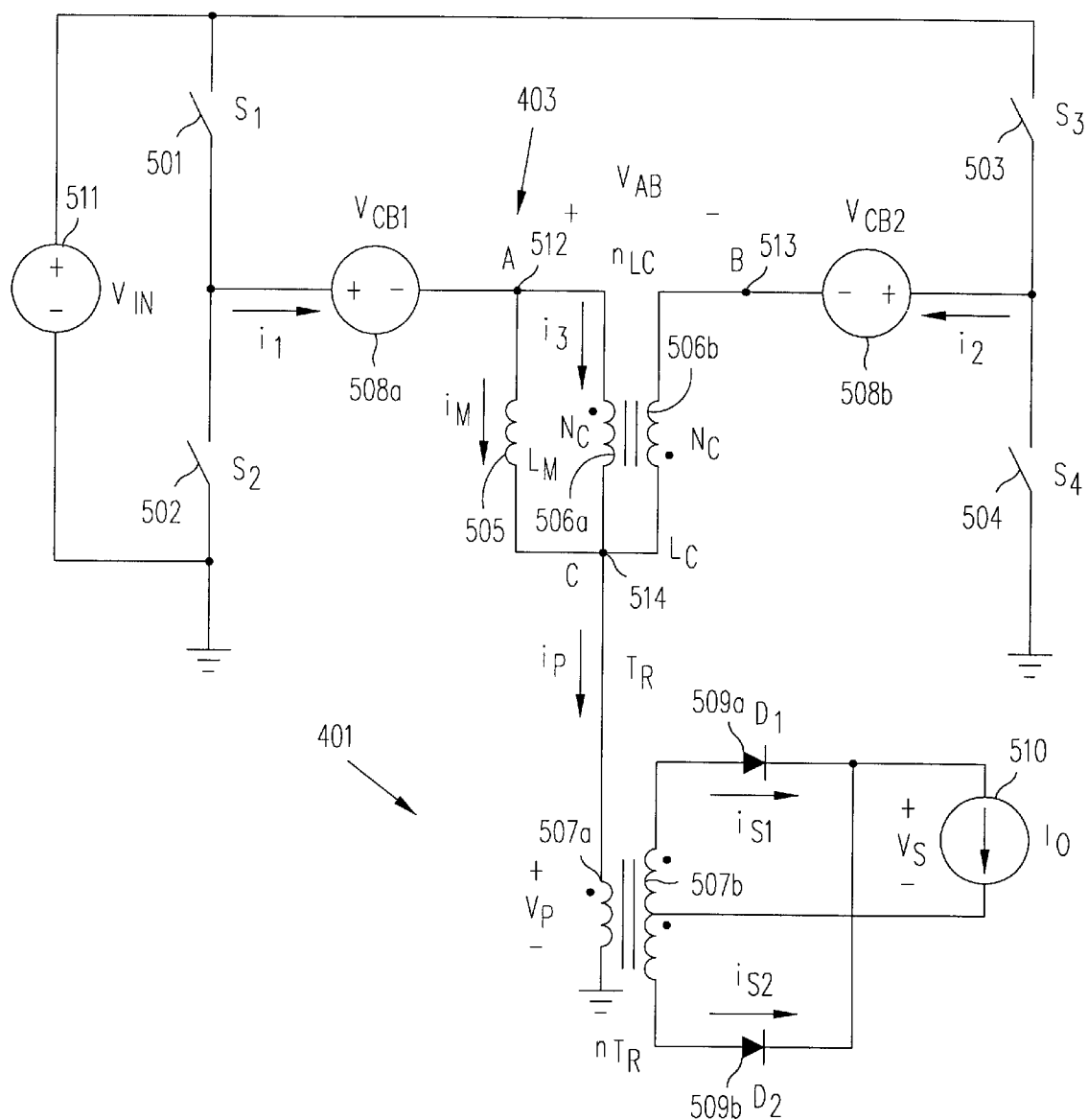
FIG. 5 shows a simplified circuit model of full-bridge ZVS PWM converter 400 of FIG. 4, showing reference directions of currents and voltages.

To facilitate explanation of the operation of converter 400, FIG. 5 is a simplified circuit model of converter 400. In FIG. 5, inductance $L_F$ of filter inductor 106 is assumed large enough so that, during a switching cycle, filter inductor 106 can be modeled as constant current source 510 with a magnitude equaling output current $I_o$. Similarly, blocking capacitors 114a and 114b are assumed large enough to be modeled as constant voltage sources 508a and 508b. Since the average voltages across windings 403a and 403b (coupled inductor 403) and across windings 401a and 401b (transformer 401) during a switching cycle are zero, when converter 400 operates each bridge leg at a 50% duty cycle, the magnitude of voltage sources 508a and 508b is each equal to $V_{in}/2$.

In FIG. 5, to further simplify the analysis, the resistances of switches 101–104 are each assumed to be zero, when conducting, and infinite, when not conducting. In addition, the small leakage inductances associated with coupled inductor 403, transformer 401, and the large magnetizing inductance of transformer 401 are neglected because their effects on converter 400's operations are assumed negligible. Magnetizing inductance of coupled inductor 403 and output capacitances 112, 113, 107 and 108 of switches 101–104 are not neglected. In FIG. 5, coupled inductor 403 is modeled as an ideal transformer 506 (with a turns ratio $n_{LC}=1$) and a parallel magnetizing inductor 505 of inductance $L_M$. Each of the windings 506a and 506b of transformer 506 is modeled with $N_c$ turns. The primary and secondary windings of transformer 401 has $N_p$ and $N_s$ turns respectively, to provide a turns ratio of $n_{TR}=N_p/N_s$.

FIGS. 6(a) to 6(l) show topological stages illustrating the operation of converter 400 during various time intervals in a switching cycle. FIGS. 7(a) to 7(o) show the respective waveforms of selected signals during the switching cycle of FIGS. 6(a) to 6(l).

Figure 6A:
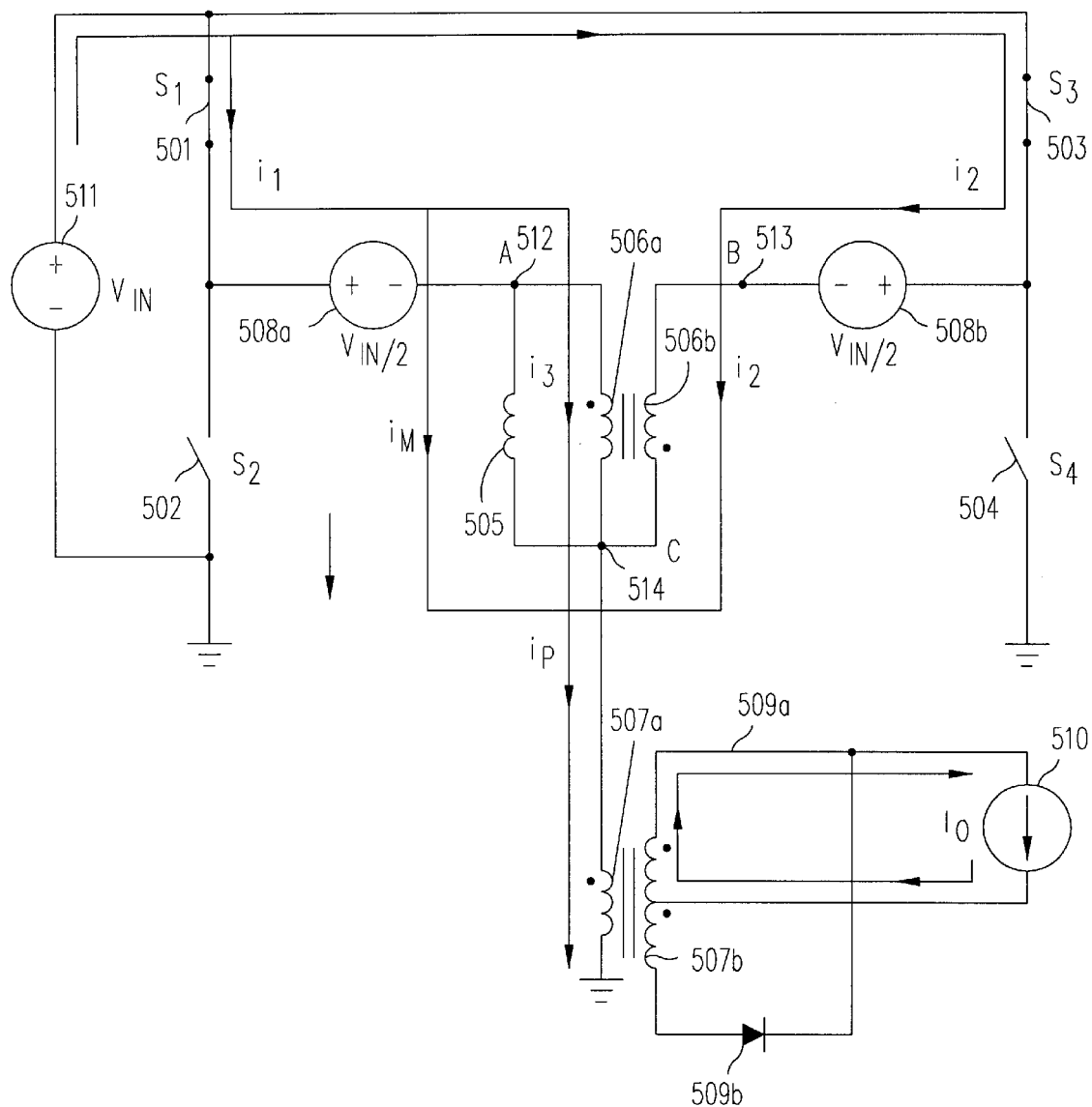
FIGS. 6(a) to 6(l) show topological stages illustrating the operation of converter 400 during various time points in a switching cycle.

During time interval t=[$T_0$, $T_1$] (FIG. 6(a)), switches 501 and 503 are closed and conduct currents $i_1$ and $i_2$, respectively. Switches 501 and 503 are controlled by signals illustrated by waveforms 701 and 703 (FIGS. 7(a) and 7(c)), respectively. Current $i_1$ (waveform 713, FIG. 7(m)) flows through blocking capacitor 508a and windings 505 and 506a of coupled inductor 403 into the primary winding 507a of transformer 507. Similarly, current $i_2$ (waveform 714, FIG. 7(n)) flows through blocking capacitor 508b and winding 506b of coupled inductor 403 into the primary winding 507a of transformer 507. At the same time, output current $i_0$ flows through rectifier 509a in an upper portion of secondary winding 507b of transformer 507. Since the turns ratio of transformer 401 is $n_{TR}$, current $i_p$ in primary winding 507a is given by:

$$i_p = i_1 + i_2 = i_o/n_{TR}$$

During this time interval (i.e., time $T_0$ to $T_1$), voltage $V_{AB}$ (waveform 709, FIG. 7(i))—the voltage across terminals 512 and 513 of coupled inductor 403 is zero, since voltage sources 508a and 508b are connected in opposition through closed switches 501 and 503. Furthermore, given coupled inductor 403's winding orientation (as indicated by the dot on winding 506b in FIG. 5) and since voltage $V_{AB}$ is zero, voltage $V_{AC}$ (i.e., the voltage across terminals 512 and 514) and voltage $V_{CB}$ (i.e., the voltage across terminals 514 and 513)—which must sum to voltage $V_{AB}$ by Kirchoff's Law—must individually be zero (i.e., $V_{AC}=V_{CB}=0$). As discussed above, at a 50% duty cycle, the voltage across each of blocking capacitors 508a and 508b is $V_{IN}/2$. Therefore, the voltage $V_p$ (waveform 710, FIG. 7(j)) across primary winding 507a is given by:

$$V_p = V_{IN} - V_{IN}/2 = V_{IN}/2$$

During this time period (i.e., time $T_0$ to $T_1$), magnetizing current $i_M$ (waveform 712, FIG. 7(l)) of the coupled inductor 403 is constant, since $V_{AC}=V_{CB}=0$. In addition, because the turns ratio $n_{LC}$ of windings 506a and 506b of transformer 403 is 1, currents $i_2$ and $i_3$ of windings 506b and 506a of transformer 403, respectively, are equal. Accordingly, from the relationships of current $i_p$ discussed above, currents $i_1$ and $i_2$ are given by:

$$i_1 = i_2 + i_M = (i_p + i_M)/2$$

$$i_2 = (i_p - i_M)/2$$

Figure 6B:
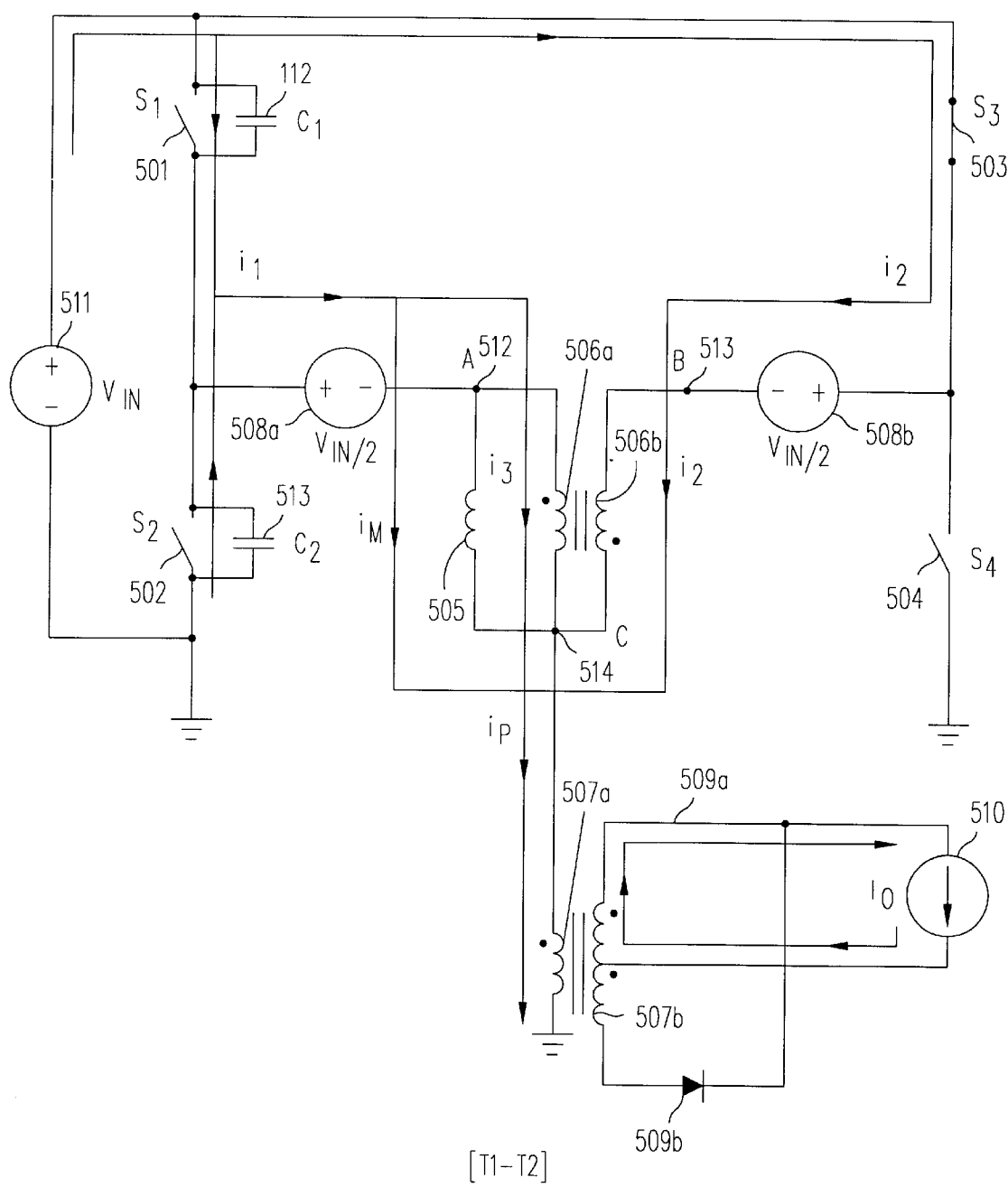
Figure 6C:
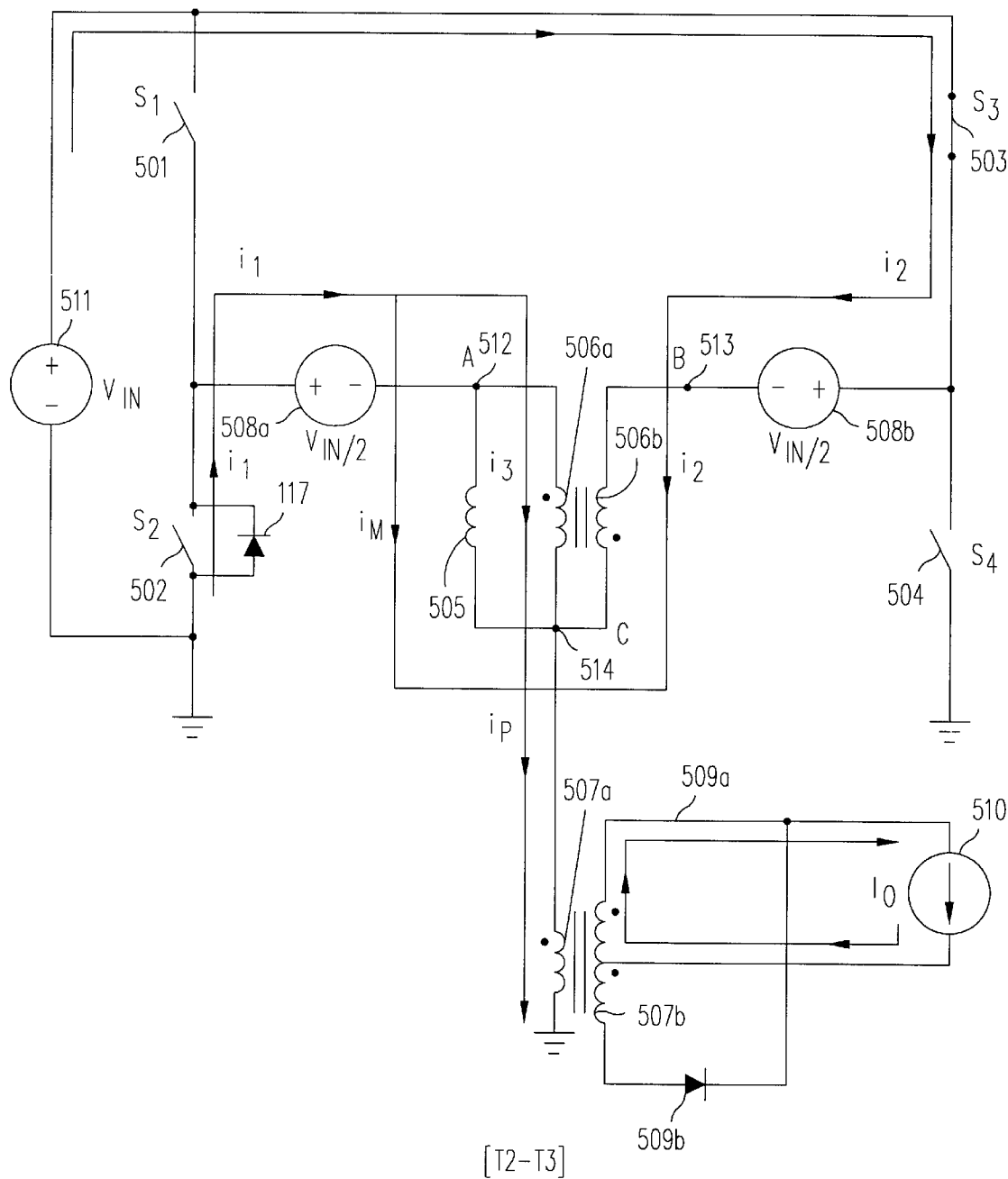
Figure 6D:
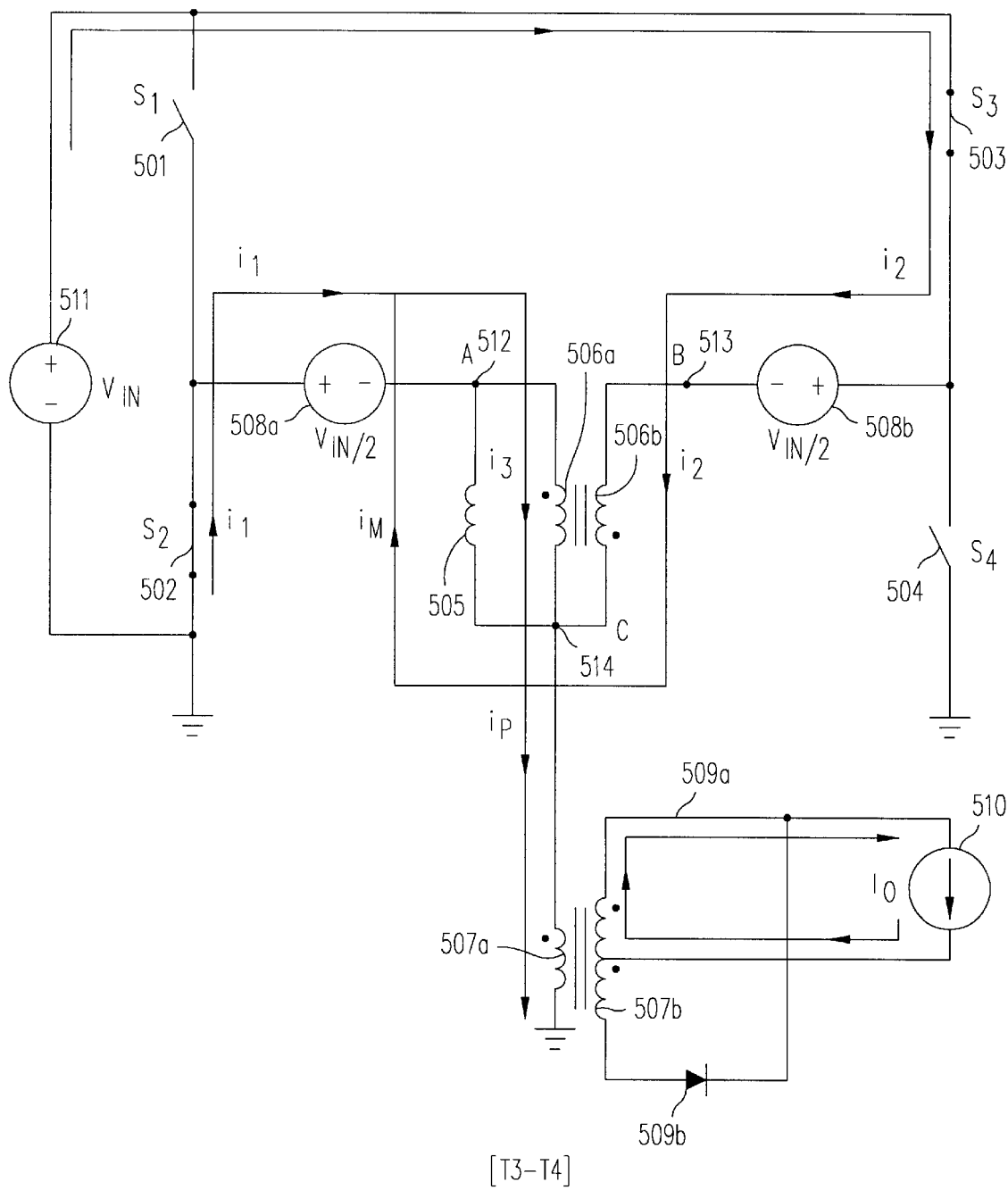
Figure 6E:
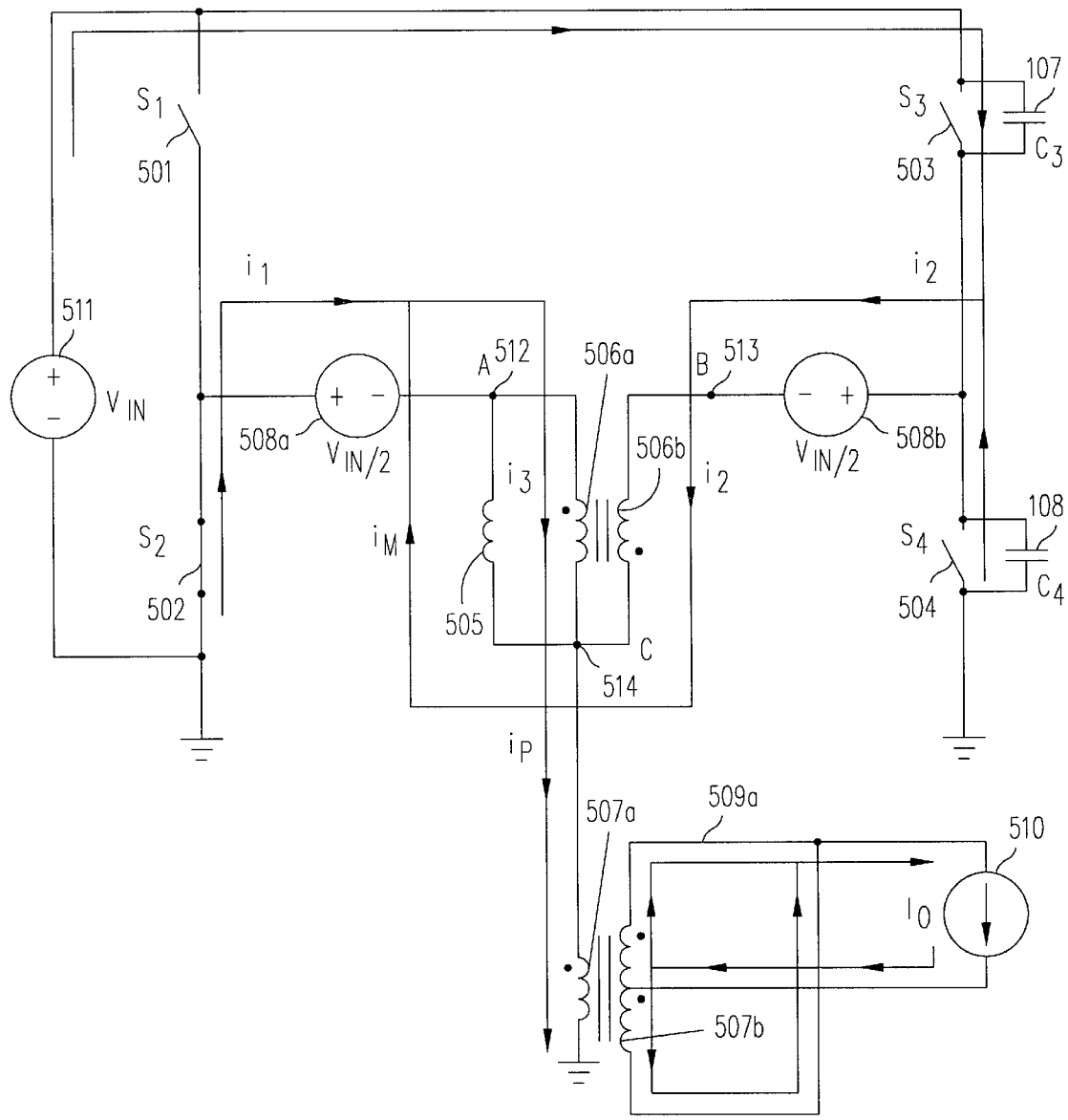
Figure 6F:
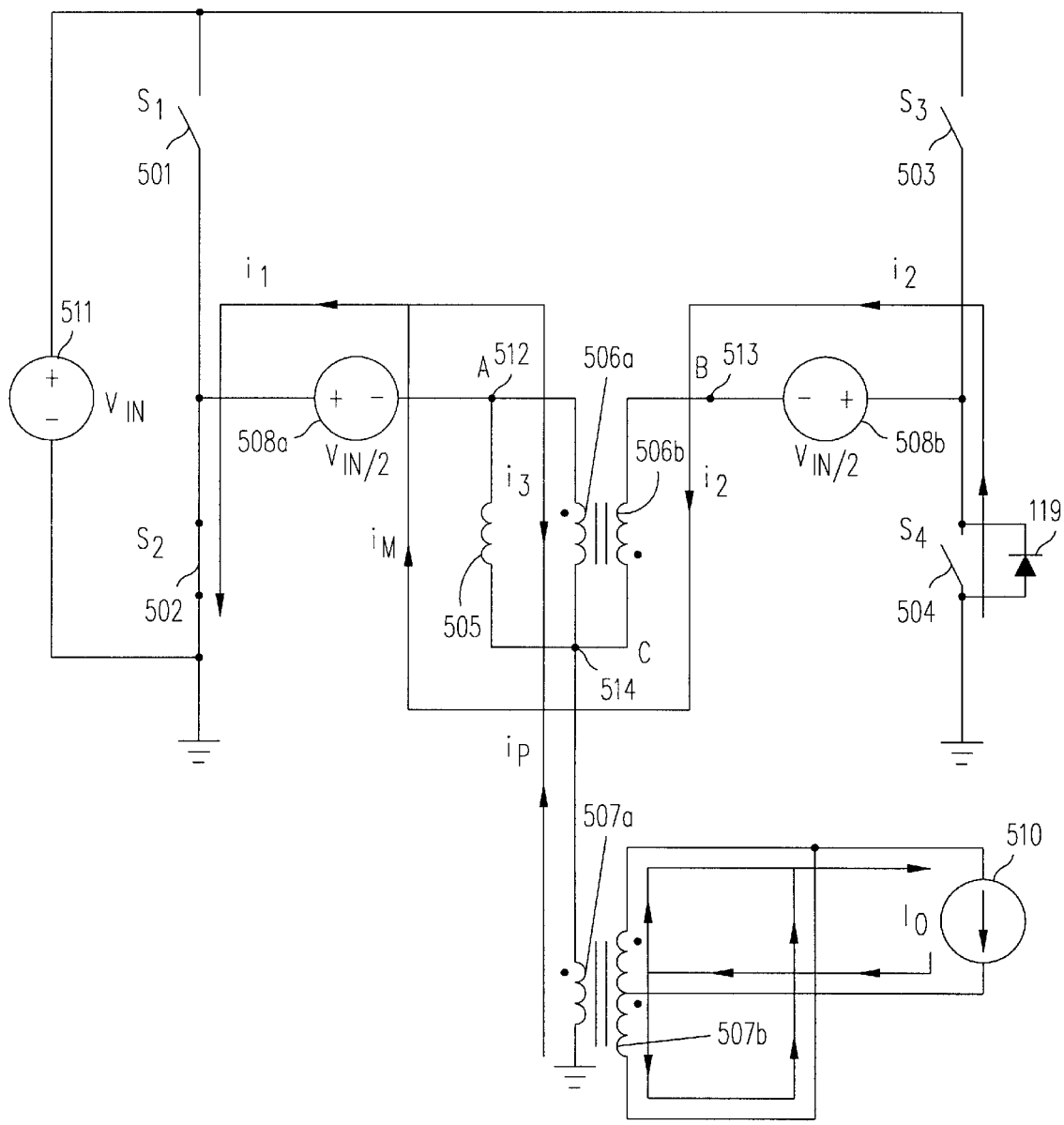
Figure 6G:
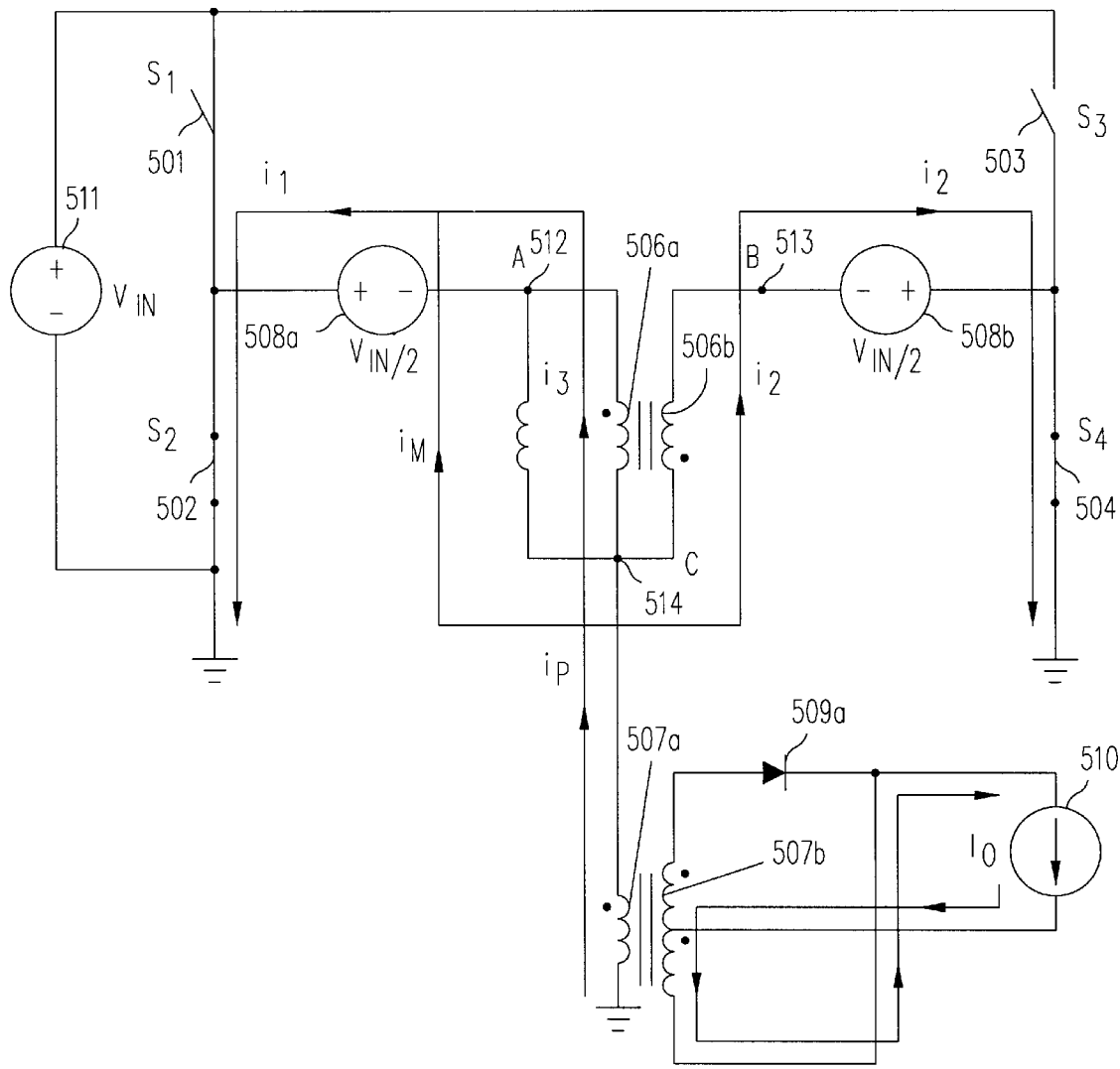
Figure 6H:
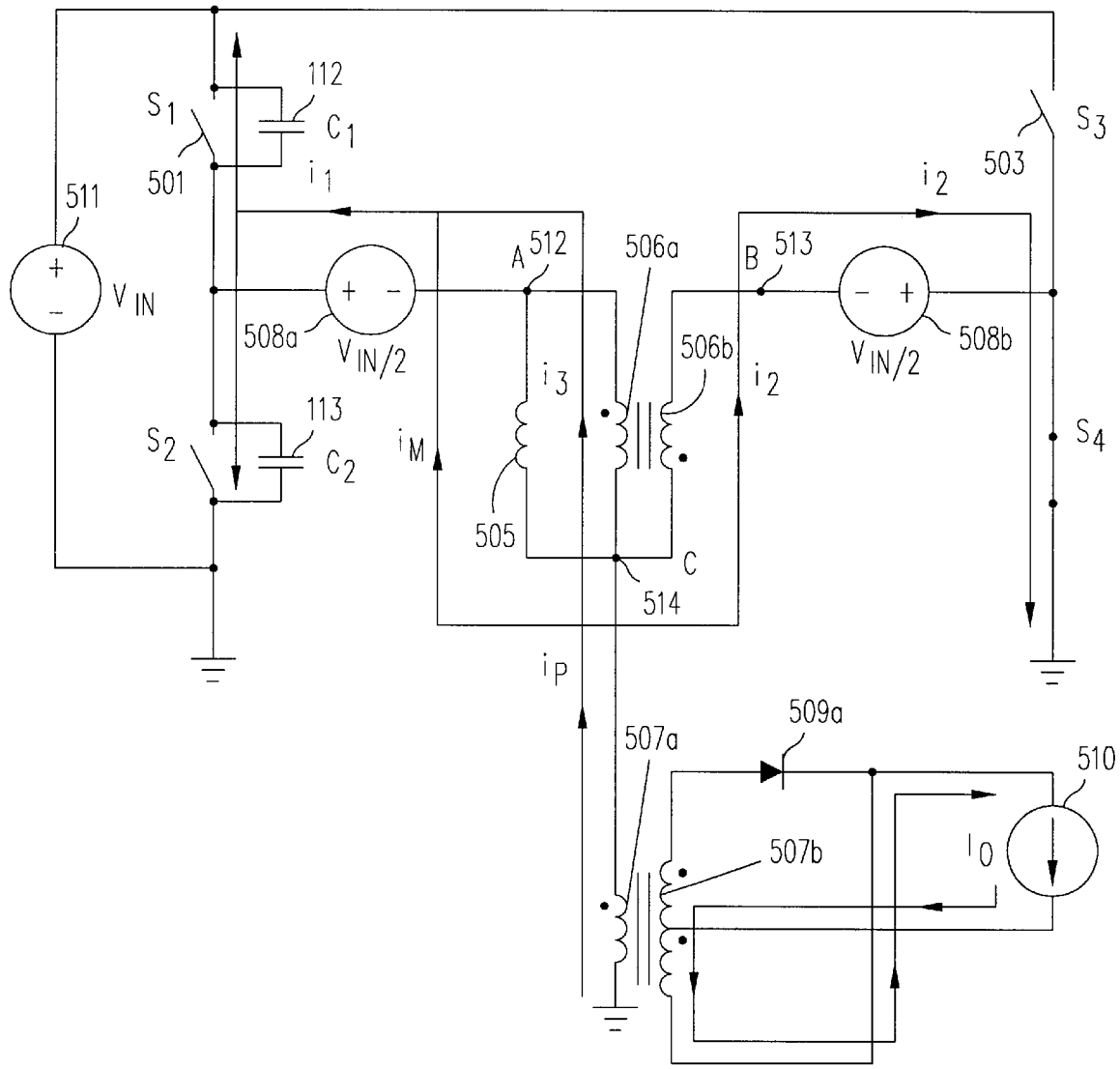
Figure 6I:
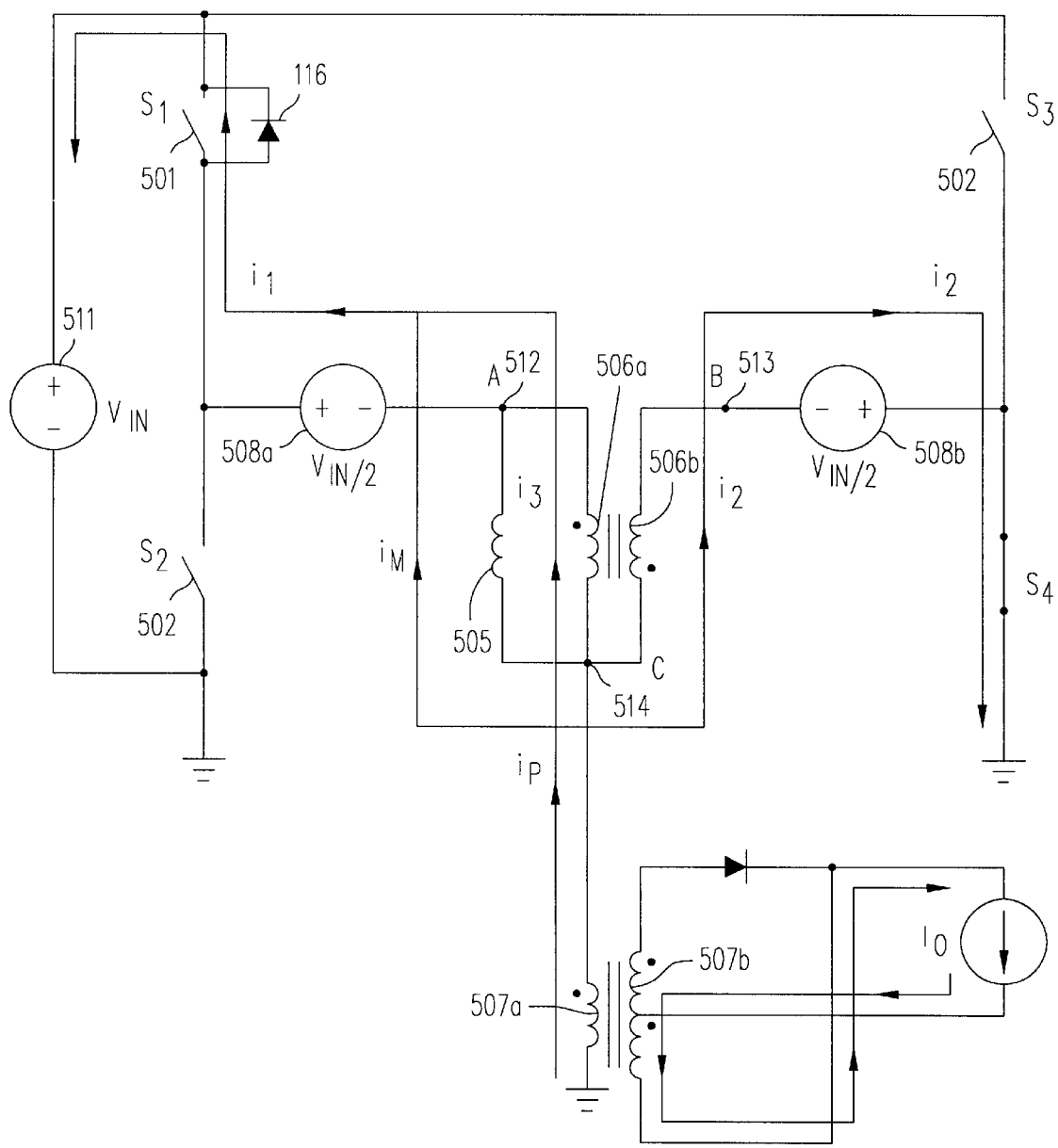
Figure 6J:
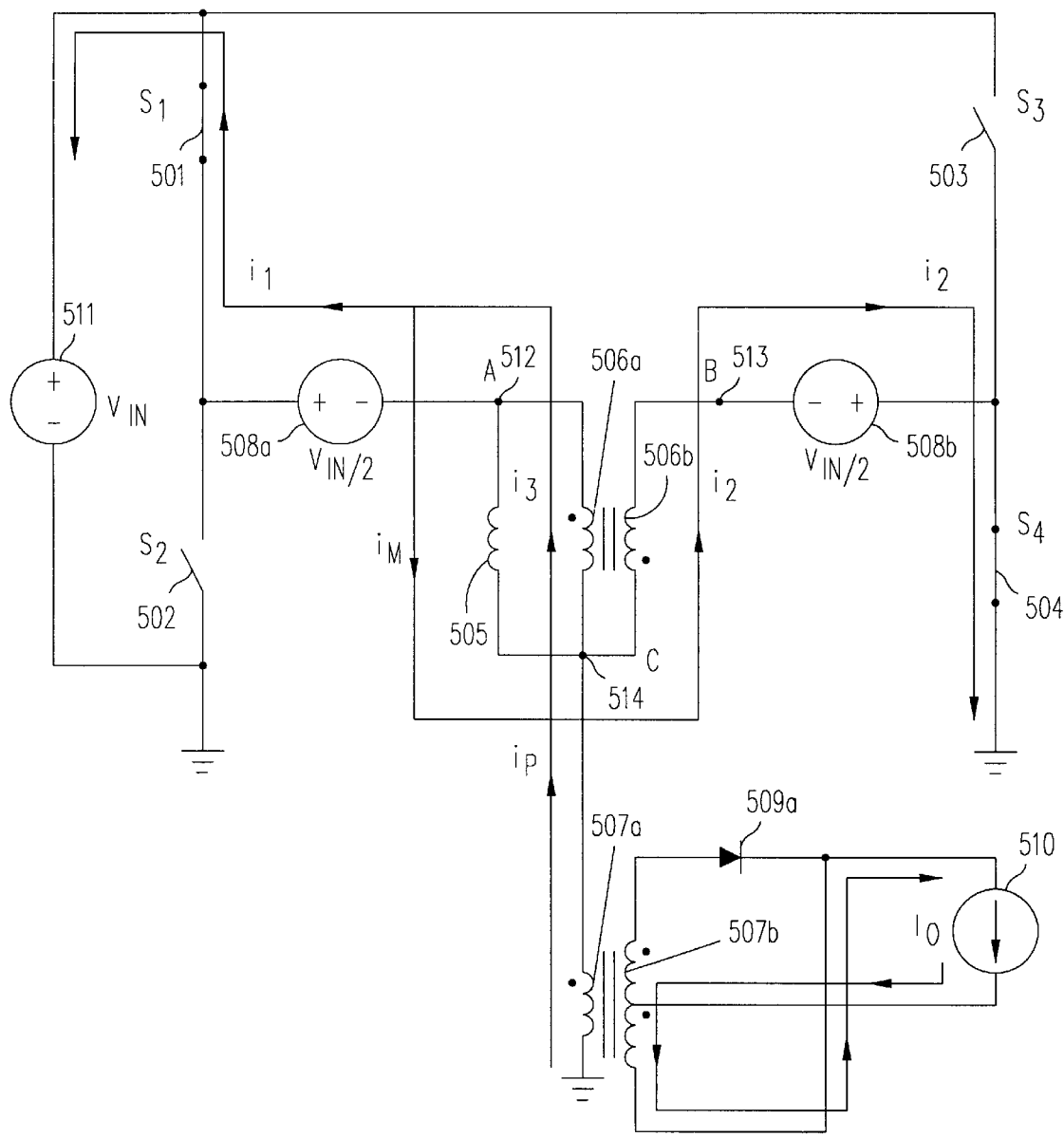
Figure 6K:
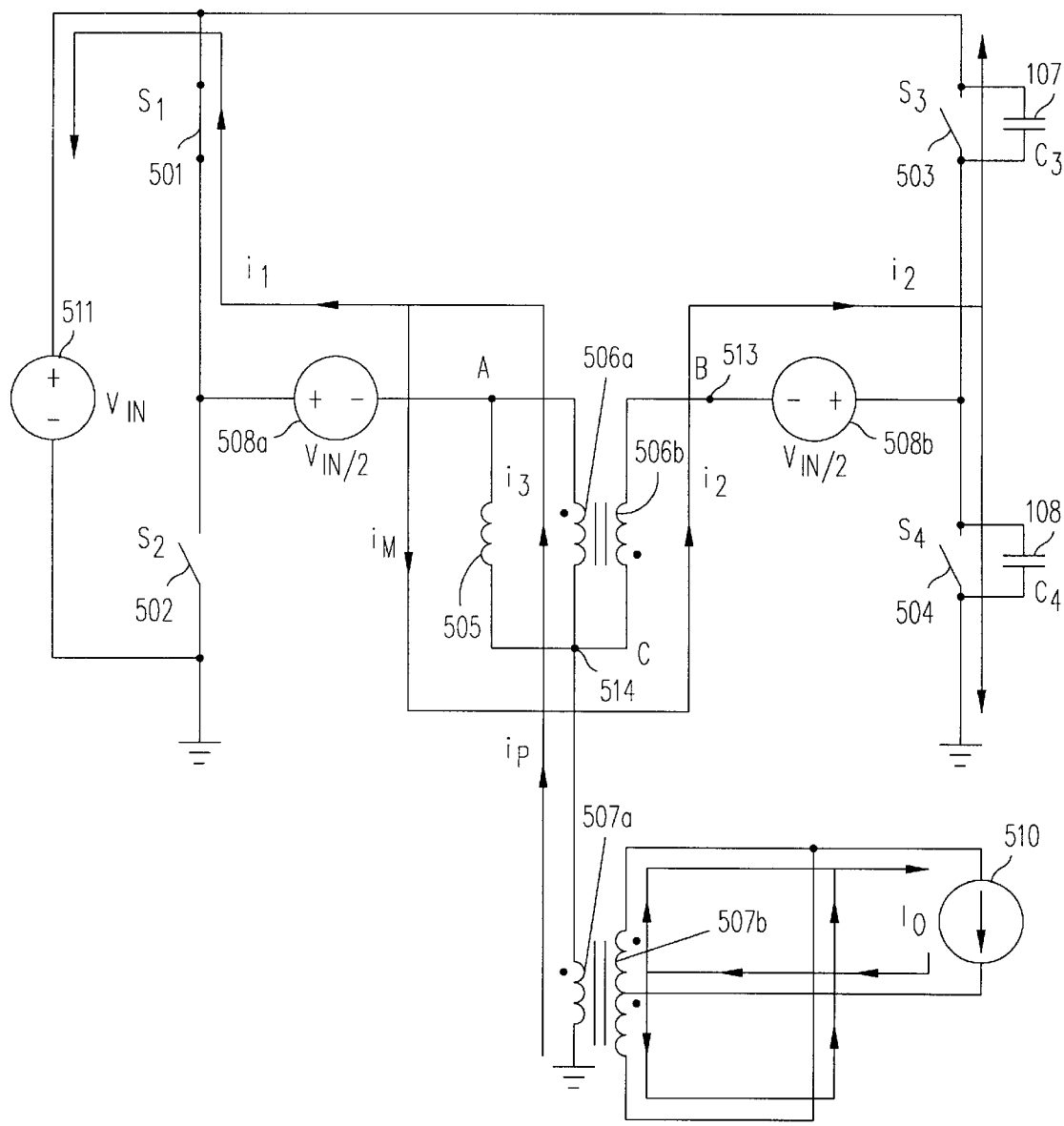
Figure 6L:
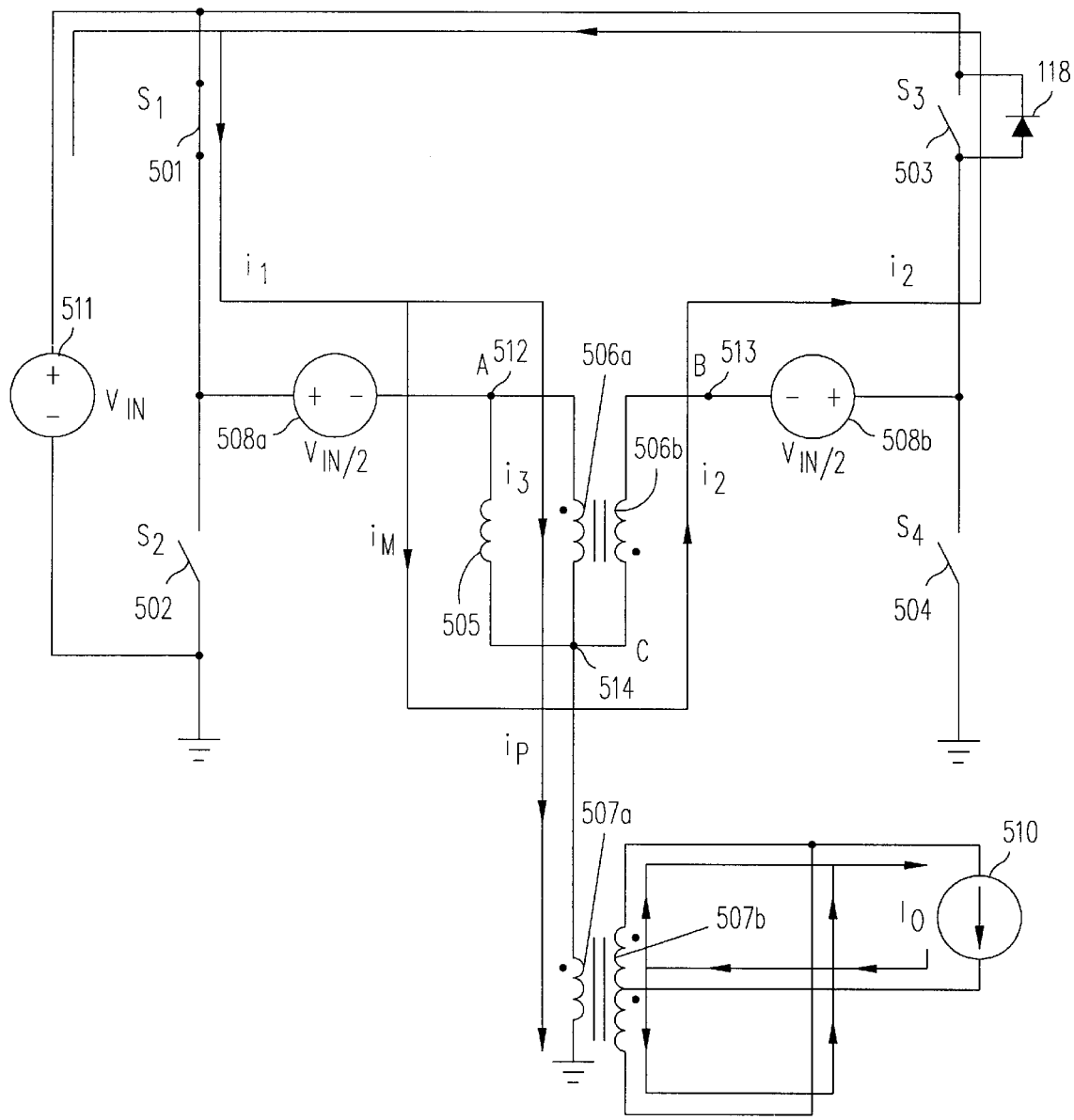

At time $t=T_1$ (FIG. 6(b)), switch 501 is open, so that current ii charges switch 501's parasitic capacitor 112 (FIG. 4). During time period [$T_1$, $T_2$], as current $i_1$ charges parasitic capacitor 112, switch 102's parasitic capacitor 113 is discharged at the same rate, since the sum of the voltages across parasitic capacitors 112 and 113 is equal to constant input voltage $V_{IN}$. As a result, the potential at node 512, voltage $V_{AB}$ (i.e., the voltage across terminals 512 and 513), and voltage $V_p$ (i.e., the voltage across primary winding 507a of transformer 401) decrease. In particular, voltage $V_{AB}$ decreases from zero toward negative $V_{IN}$, and voltage $V_p$ decreases from $V_{IN}/2$ toward zero, as seen in waveforms 709 and 710 of FIGS. 7(*i*) and 7(*j*), respectively.

When parasitic capacitor 113 is fully discharged, i.e., when the voltage $V_{S2}$ (waveform 706, FIG. 7(*f*)) across switch 502 reaches zero, current $i_1$ flows through antiparallel diode 117 of switch 502, as shown in FIG. 6(*c*). As a voltage $-V_{IN}/2$ is applied across terminals 512 and 513 of coupled inductor 403, the magnetizing current $i_M$ decreases at a rate of $V_{IN}/(2L_M)$. During time interval [$T_2$, $T_3$] (FIG. 6(*c*)), current $i_p$ in primary winding 507*a* remains constant at $I_o/n_{TR}$. Consequently, current $i_1 = (i_p + i_M)/2$ decreases at a rate having the same magnitude as the rate current $i_2 = (i_p - i_M)/2$ increases. During this time, while the antiparallel diode 117 is conducting, switch 502 can close under ZVS condition. Thus, in this embodiment, switch 502 is switched on upon $V_{S2}$ (waveform 706, FIG. 7(*f*)) falling to zero.

At time t'$T_3$, magnetizing current $i_M$ becomes zero and continues to decrease (waveform 712, FIG. 7(*l*)). As a result, current $i_1$ continues to decrease and current $i_2$ continue to increase (waveforms 713 and 714, FIGS. 7(*m*) and (*n*)) The current flow during time period [$T_3$, $T_4$] is shown in FIG. 6(*d*). At t=$T_4$, switch 503 is opened, so that current $i_2$ begin to charge parasitic capacitor 107 of switch 503, raising the voltage $V_{S3}$ across switch 503 (waveform 707, FIG. 7(*g*)). As parasitic capacitor 107 charges, parasitic capacitor 108 of switch 504 discharges at a rate of equal magnitude, so that voltage $V_{s4}$ (waveform 708, FIG. 7(*h*)) across switch 504 decreases from $V_{IN}$ to zero. During time interval [$T_4$, $T_5$] (FIG. 6(*e*)), potential at node 513 decreases from $V_{IN}/2$ toward $-V_{IN}/2$, while potential at node 512 remains at $-V_{IN}/2$. Thus, voltage $V_{AB}$ across terminals 512 and 513 increases from $-V_{IN}$ toward zero. At the same time, voltage $V_p$ across primary winding 507*a* decreases from zero to $-V_{IN}/2$ forcing load current $I_o$ to commute from the upper portion of secondary winding 507*b* to a lower portion of secondary winding 507*b*. If the respective leakage inductances of transformer 401, coupled inductor 403, and the interconnecting conductors are negligibly small, the commutation of current $I_o$ would substantially be instantenous. However, as the parasitic inductances on both the primary and secondary sides of transformer 401 are not negligible, the commutation of load current $I_o$ is not instantaneous. In fact, as shown in FIG. 6(*e*), when voltage $V_p$ becomes negative, load current $I_o$ is carried by both the upper and lower portions of secondary winding 507*b* (i.e., the transformer windings are effectively shorted).

During time interval [$T_5$, $T_6$] (FIG. 6(*f*)), current $i_p = (i_4 - i_5)/n_{TR}$ (currents $i_4$ and $i_5$ being the currents in the upper and the lower portions of secondary winding 507*b*) changes direction when current is exceeds current $i_4$. At time t=$T_6$, current $I_o$ completes its commutation from the upper portion of secondary winding 507*b* to the lower portion of secondary winding 507*b*. Switch 504 is closed under ZVS condition while current $i_2$ is positive (i.e. while current $i_2$ flows through antiparallel diode 119). As illustrated by waveforms 704 and 708, FIGS. 7(*d*) and 7(*h*), switch 504 is closed after time t=$T_5$, immediately upon voltage $V_{s4}$ across switch 504 falls to zero.

During time interval [$T_6$, $T_7$] (FIG. 6(*g*)), currents $i_M$, $i_p$, $i_1$, and $i_2$ are constant and negative.

The second half of the switching cycle of FIGS. 7(*a*) to 7(*o*) begins at time t=$T_7$ when switch 502 is opened. Consequently, parasitic capacitor 113 of switch 502 charges and parasitic capacitor 112 of switch 501 discharges, as illustrated in FIG. 6(*h*). During time interval [$T_7$, $T_8$], voltage $V_{AB}$ across terminals 512 and 513 of coupled inductor 403 increases from zero toward $V_{IN}$, and voltage $V_p$ across primary winding 507*a* of transformer 401 increases from $-V_{IN}/2$ to zero. At time t=$T_8$, voltage $V_{s1}$ across switch 501 reaches zero and antiparallel diode 116 of switch 501 begins to conduct (see FIG. 6(*i*)). Switch 501 is closed under a ZVS condition, while antiparallel diode 116 is conducting. As illustrated by waveforms 701 and 705 of FIGS. 7(*a*) and 7(*e*), switch 501 is closed immediately after $V_{s1}$, across switch 501 has fallen to zero.

After switch 502 is opened at time t=$T_7$, voltage $V_{AB}$ across nodes 512 and 513 begins to rise and magnetizing current $i_M$ increases also at a linear rate (see waveforms 709 and 712 of FIGS. 7(*i*) and 7(*l*)), since constant voltage $V_{AC} = V_{AB}/2 = V_{IN}/2$ is applied across magnetizing inductance 505. At time t=$T_9$, current $i_M$ becomes positive (FIG. 6(*j*)). At time t=$T_{10}$, switch 504 is opened, so that parasitic capacitor 107 of switch 503 begins to discharge and parasitic capacitor 108 of switch 504 begins to charge. During time interval [$T_{10}$, $T_{11}$] (FIG. 6(*k*)), the potential at terminal 513 rises from $-V_{IN}/2$ to $V_{IN}/2$, while the potential at terminal 512 remains constant at $V_{IN}/2$. Thus, voltage $V_{AB}$ decreases from $V_{IN}$ toward zero, while voltage $V_p$ rises from zero toward $V_{IN}/2$. As a result, load current $I_o$ commutes from the lower portion of secondary winding 507*b* back to the upper portion of secondary winding 507*b*.

At time t=$T_{11}$, parasitic capacitor 107 of switch 503 is fully discharged and current $i_2$ begins to flow through antiparallel diode 118 of switch 503, as shown in FIG. 6(*l*). Switch 503 is closed under a ZVS condition shortly after antiparallel diode 118 starts conducting. During time interval [$T_{11}$, $T_{12}$], as shown in FIG. 6(*l*), primary current $i_p$, current $i_1$ and current $i_2$ continue to increase from negative values toward positive values (see waveforms 711, 713 and 714 in FIGS. 7(*k*), 7(*m*), and 7(*n*), respectively). At time t=$T_{12}$, the commutation of the 503–504 leg is complete, and converter 400 returns to the same topological stage shown in FIG. 6(*a*).

As illustrated by waveforms 712, 713 and 714 in FIGS. 7(*l*), 7(*m*) and 7(*n*), the commutation of the switches in the 501–502 leg is initiated when current $i_1 = i_2 + i_M = (i_p + i_M)/2$ is maximum (i.e., when $i_1 = (I_o/n_{TR} + I_M)/2$). Similarly, the commutation of the switches in the 503–504 leg is initiated when current $i_2 = (i_p - i_M)/2$ is maximum (i.e., when $i_2 = (I_o/n_{TR+IM})/2$). Therefore, in converter 400, all primary switches are commutated under the same current magnitude. The charging and discharging of the parasitic capacitors of bridge switches 501–504 are provided by the energy stored in filter inductor 106 (which is proportional to $I_o/n_{TR}$, the current in primary winding 507*a*), and by the energy stored in the magnetizing inductance 505 of coupled inductor 403 (which is proportional to current $I_M$). To achieve a ZVS condition in each of bridge switches 501–504, the total energy stored in magnetizing inductor 505 of coupled inductor 403 and in filter inductor 106 is preferably high enough to fully discharge the parasitic capacitor of the switch which is about to be closed. Generally, this ZVS condition can be expressed as:

$$\frac{1}{2}\left[\frac{1}{2}L_F I_O^2 + \frac{1}{2}L_M I_M^2\right] \geq CV_{IN}^2 + \frac{1}{2}C_{LC}V_{IN}^2 + \frac{1}{2}C_{TR}\left[\frac{V_{IN}}{2}\right]^2$$

where C is the capacitance of each primary switch, $C_{LC}$ is the inter-winding capacitance of coupled inductor 403, and $C_{TR}$ is the capacitance seen across the primary winding of transformer 401 that includes inter-winding capacitance of transformer 401 and any reflected capacitance of the secondary-side circuit. If capacitances $C_{LC}$ and $C_{TR}$ are neglected, the ZVS condition simplifies to:

$$L_F I_O^2 + L_M I_M^2 \geq 4CV_{IN}^2$$

Thus, the present invention enables primary switches to switch under ZVS conditions over wide input voltage and load ranges, and even at a no-load condition. At higher load currents, ZVS is primarily achieved by the energy stored in filter inductor 106. As load current $I_o$ decreases, even though the energy stored in filter inductor 106 also decreases, magnetizing inductor 505 of coupled inductor 403 provides an increasing share of the energy required for ZVS. In fact, at a no-load condition, magnetizing inductor 505 provides all energy required to create a ZVS condition. Therefore, if the inductance value $L_M$ is selected such that ZVS is achieved at no load and maximum input voltage $V_{IN(max)}$, ZVS is achieved over the entire load and input voltage ranges.

The value of $L_M$ required to achieve ZVS at a no-load condition is calculated from the fact that, during time interval [$T_8$, $T_{10}$], magnetizing current $i_M$ changes linearly from a negative value $I^-$ to a positive value $I^+$ at a rate of $V_{IN}/2L_M$ (waveform 712, FIG. 7(*l*)), due to a voltage of $V_{IN}/2$ across terminals 512 and 514 of coupled inductor 403. The voltage swing between ($T_8$, $T_{10}$] is approximately $2I_M$, where $I_M$ is the steady state value of current $i_M$ (e.g. during interval [$T_{12}$, $T_{13}$]). Since time interval [$T_8$, $T_{10}$] is approximately equal to $(1-D)T_s/2$, where D is the duty cycle of switch operation and $T_s$ is a switching period, the value $I_M$ can is given by:

$$\frac{V_{IN}}{2} = L_M \frac{2I_M}{(1-D)\frac{T_S}{2}}$$

or $$I_M = \frac{(1-D)V_{IN}}{8L_M f_S}$$

where $f_s = 1/T_s$ is the switching frequency. At a no-load condition, $D \approx 0$ because the two bridge legs must be out of phase to reduce volt-second product across primary winding 507a. Hence, the ZVS condition at no-load and high line voltage is given by:

$$\frac{1}{2} L_M \left[\frac{V_{IN(max)}}{8L_M f_S}\right]^2 \geq 4CV_{IN(max)}^2$$

so that the value of magnetizing inductance $L_M$ required for such a condition is:

$$L_M = \frac{1}{512 \, C f_S^2}$$

Figure 2:
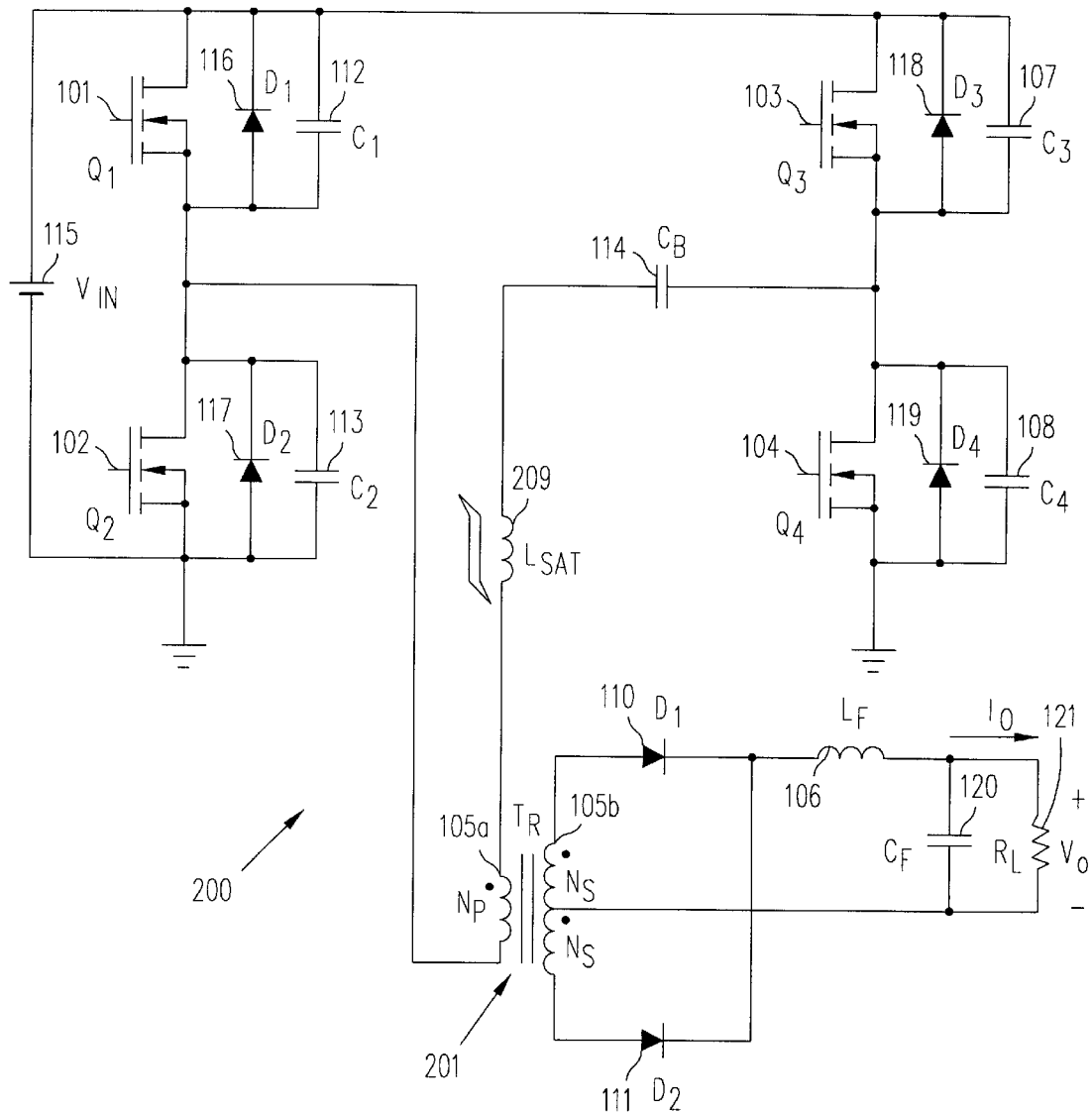
FIG. 2 shows improved full-bridge ZVS-PWM converter 200 including saturable core inductor 209.
Figure 3:
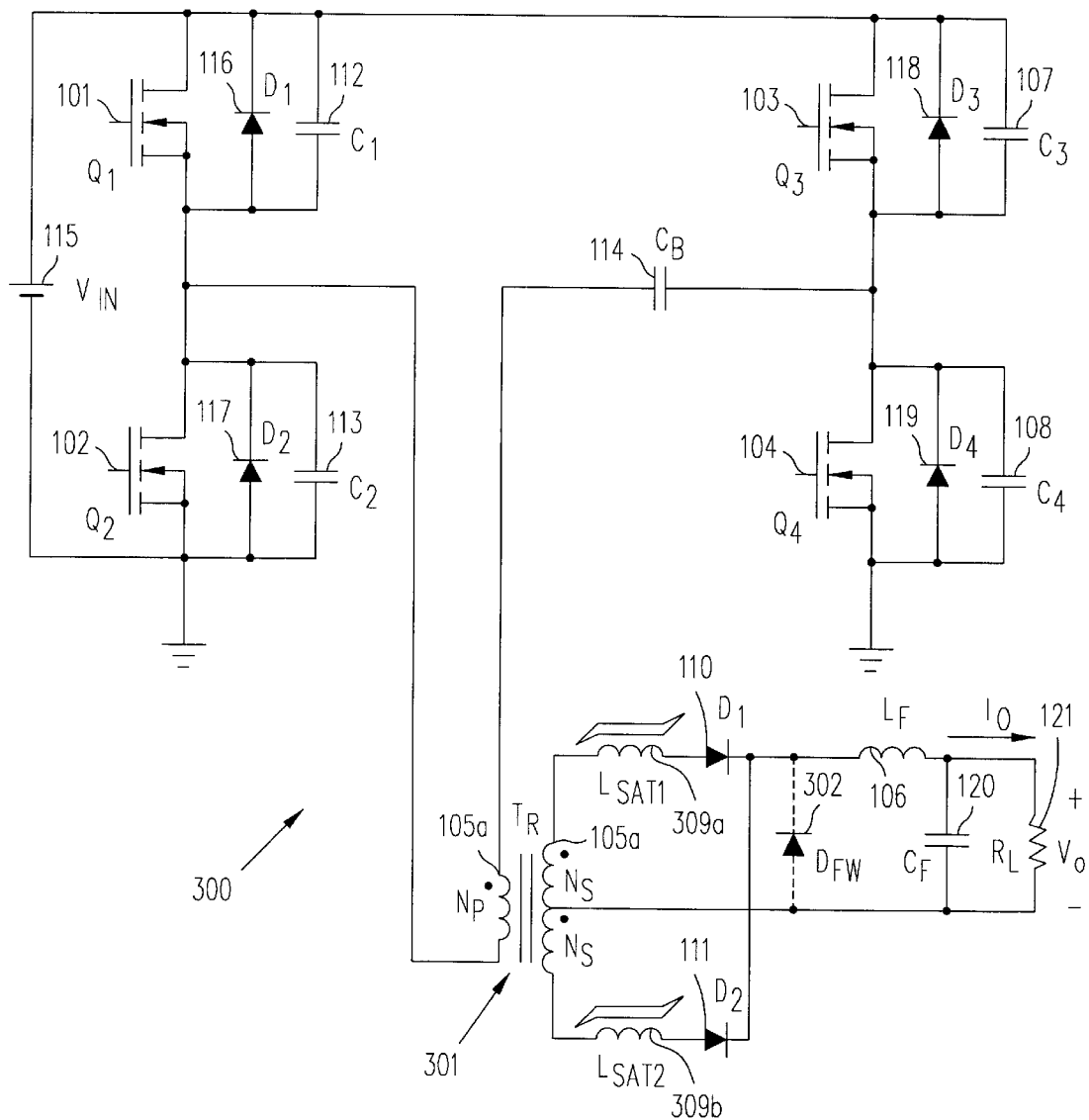
FIG. 3 shows yet another improved full-bridge ZVS PWM converter 300, which utilizes saturable inductors 309a and 309b on a secondary side of transformer 301.

Further, as shown in FIG. 5, current $i_M$ in magnetizing inductance $L_M$ of coupled inductor 403 introduces a current asymmetry in the two bridge legs. Namely, because currents $i_2$ and $i_3$ of coupled windings 506a and 506b are equal, and since $i_1 = i_2 + i_M$, the circuit in leading leg 501–502 is higher than the current in lagging leg 503–504, the difference being magnetizing current $i_M$. (Thus, converter 400 is different from prior art converters 100–300 of FIGS. 1–3, at least in that the current $i_p$ in each of the prior art converters is carried by two bridge legs connected in series.) Magnetizing inductance $L_M$ should be maximized to minimize the current asymmetry in the bridge legs. Furthermore, if this minimized current asymmetry is still significant (i.e., if current $i_2$ in lagging leg 503–504 is significantly lower than current $i_1$ in the leading leg 501–502), different sizes can be selected for the switches in the two legs, which may reduce the cost of the implementation without sacrificing circuit performance.

Figure 8:
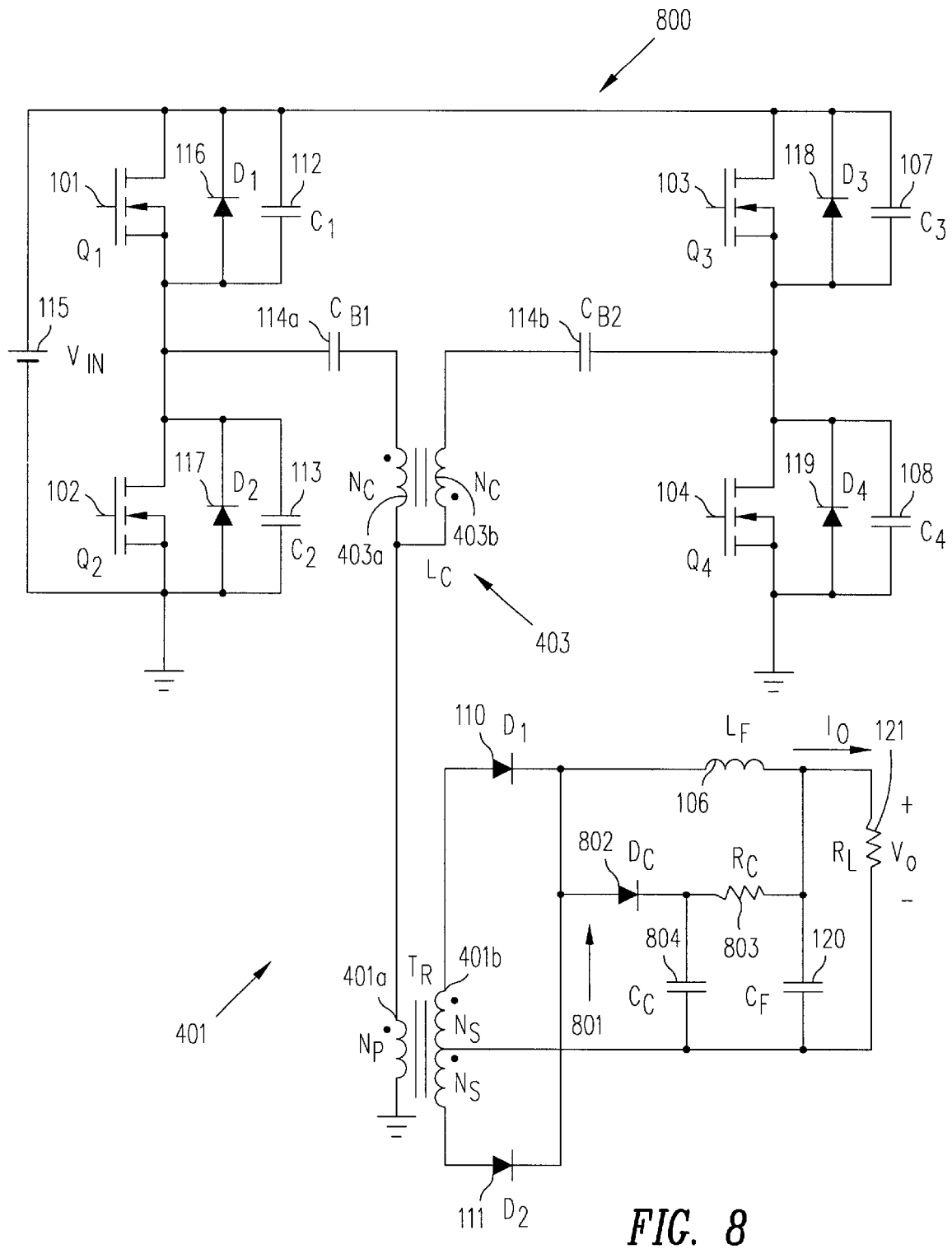
FIG. 8 shows an embodiment of present invention in full-bridge ZVS PWM converter 800, including secondary-side RCD-snubber 801.

In addition, converter 400 has significantly reduced parasitic ringing on the secondary side because, unlike the prior art, an increased leakage inductance in transformer 401, or a large external inductor (non-coupled) in series with transformer 401, is not required to store the required energy to create a ZVS condition for the leading leg switches of the bridge. Since leakage inductance in transformer 401 can be minimized, ringing between this leakage inductance of transformer 401 and the junction capacitances of rectifiers 509a and 509b can be greatly reduced. Any residual parasitic ringing can be damped using a small snubber circuit, such as RCD-snubber circuit 801 of FIG. 8. FIG. 8 shows converter 800, substantially similar to converter 400 of FIG. 4, but including RCD-snubber circuit 801.

Converter 400 can be controlled in substantially the same manner as any conventional constant-frequency FB ZVS converter. In fact, any commercially available integrated phase-shift controllers can be used to control converter 400. Unlike conventional ZVS PWM converters, however, converter 400 provides a maximum output voltage $V_o$ when the bridge legs are operated in-phase. In-phase operation can be provided, for example, by a simple control signal inversion in the voltage control loop.

Figure 9:
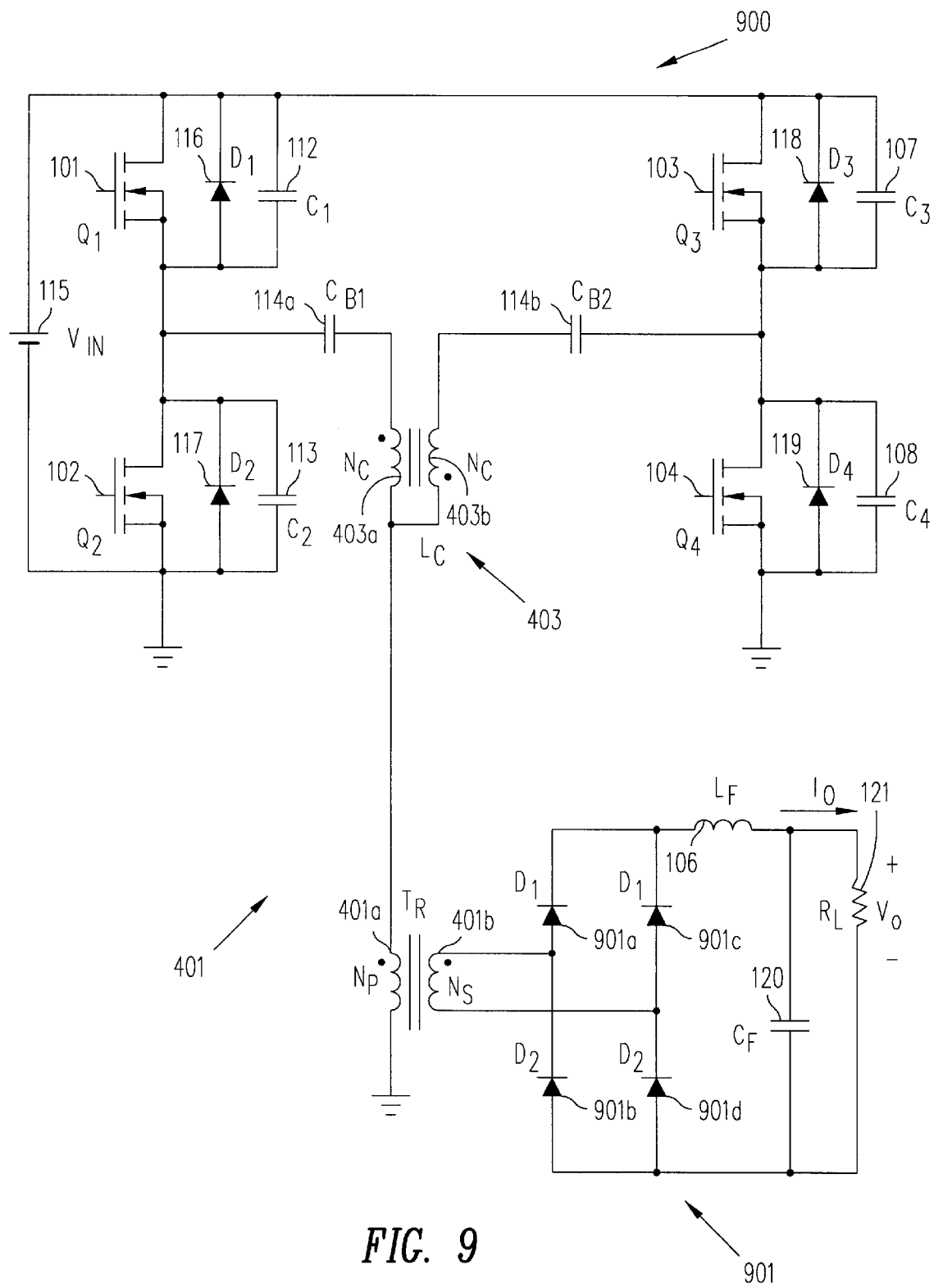
FIG. 9 shows embodiment of present invention in full-bridge ZVS PWM converter 900 with full-wave full-bridge rectifier 901.
Figure 10:
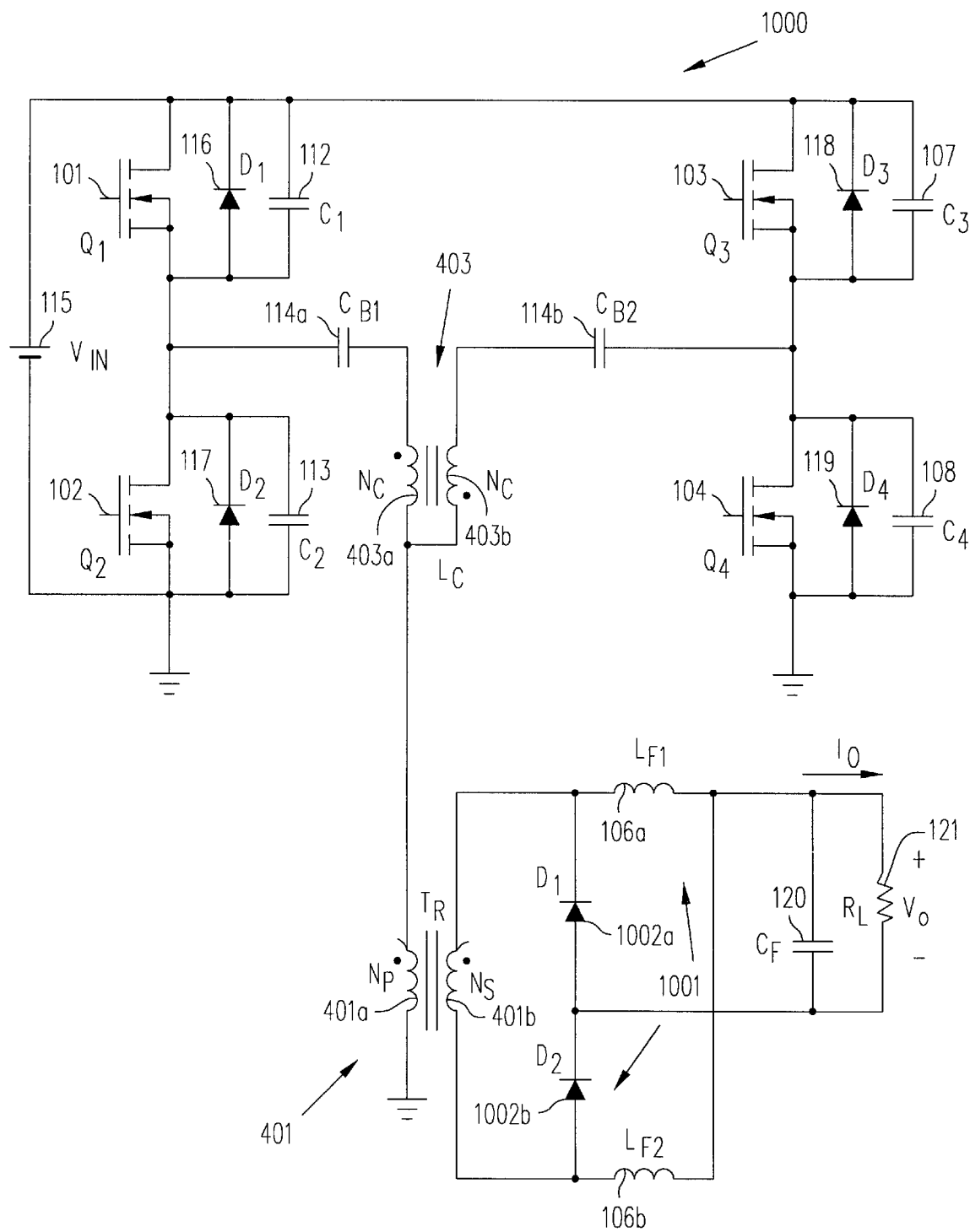
FIG. 10 shows embodiment of present invention in full-bridge ZVS PWM converter 1000 with current-doubler rectifier 1001.

In addition, the present invention can be practiced with any type of the secondary-side rectifier, not just with the full-wave rectifier and a center-tap transformer as in converter 400. For example, converters 900 and 1000 of FIGS. 9 and 10 are shown implemented with full-wave, full-bridge rectifier 901 and current-doubler rectifier 1001, respectively.

The performance of converter 400 was verified using a 670 W experimental FB converter operating at 112 kHz. In this implementation, converter 400 operates from a 400V DC input voltage to deliver 14A at 48V output. Table 1 below shows an efficiency comparison between a conventional FB ZVS PWM implementation (e.g. converter 100 of FIG. 1) and converter 400, as implemented in the experimental converter. As shown in Table 1, converter 400 shows much higher efficiencies than conventional converter 100 over the entire power (i.e., load-current) range. At full power, the efficiency improvement is around 3%, which translates into a conduction loss reduction of more than 30%. At lower power levels, the efficiency improvements are even more remarkable because converter 400 does not circulate significant energy. For example, at an output power of 50 W, the efficiency improvement is more than 20%.

TABLE I

| Output Power (W) | Efficiency of Conventional FB ZVS PWM Converter (%) | Efficiency of an FB ZVS PWM converter under the present invention (%) |
|---|---|---|
| 48 | 66.2 | 88.55 |
| 96 | 81.79 | 93.75 |
| 144 | 87.46 | 94.99 |
| 192 | 89.89 | 95.24 |
| 240 | 91.51 | 95.54 |
| 288 | 91.95 | 95.75 |

TABLE I-continued

| Output Power (W) | Efficiency of Conventional FB ZVS PWM Converter (%) | Efficiency of an FB ZVS PWM converter under the present invention (%) |
|---|---|---|
| 336 | 92.42 | 95.35 |
| 384 | 92.66 | 95.14 |
| 432 | 92.67 | 95.07 |
| 480 | 92.88 | 95.21 |
| 528 | 92.96 | 95.24 |
| 576 | 92.84 | 95.05 |
| 624 | 92.64 | 95.06 |
| 672 | 92.37 | 95.13 |

The above detailed description is provided to illustrate specific embodiments of the present invention and is not intended to be limiting. Numerous variations and modification within the scope of the present invention are possible. The present invention is set in the following claims.

We claim:

1. An improved, constant-frequency, phase-shift-controlled full-bridge dc-to-dc converter, comprising:

first and second pairs of serially-connected controllable switching devices, each pair adapted to connect across a power source, each of said controllable switching device comprising a switch, an antiparallel diode coupled across said switch and a capacitor coupled across said switch;

a coupled inductor having first and second windings, each winding having a first terminal and a second terminal, said second terminals of said first and second windings being connected to form a common terminal of said coupled inductor;

first and second blocking capacitors, said first blocking capacitor being coupled between said first terminal of said first winding of said coupled inductor and a common terminal of said first pair of controllable switching device, and said second blocking capacitor being coupled between said first terminal of said second winding of said coupled inductor and a common terminal of said second pair of controllable switching device;

a transformer having first and second windings, said first winding of transformer being coupled between said common terminal of said coupled inductor and a terminal of said power source; and an output circuit coupling said secondary winding of said transformer to a load.

2. A converter as in claim 1 wherein, in each of said first and second pair of controllable switching device, a delay time is provided between opening of one switch in said pair of controllable switching device and closing of the other switch in said pair of controllable switching device.

3. A converter as in claim 2 wherein, a delay time is provided between closing of in one switch in one of said first and second pairs of controllable switching device and closing of a corresponding switch in the other one of said first and second pairs of controllable switching device.

4. A converter as in claim 1, wherein a turns ratio of said first winding of said coupled inductor to said second winding of said coupled inductor is 1.

5. A converter as in claim 1, wherein said output circuit comprises a full-wave full-bridge rectifier.

6. A converter as in claim 1 wherein said output circuit comprises a current-doubler rectifier.

7. A converter as in claim 1 wherein said secondary winding of said transformer is center-tapped.

8. A converter as in claim 1, wherein said output circuit comprises a full-wave rectifier.

9. A converter as in claim 1, wherein said output circuit comprises an RCD snubber.

10. A converter as in claim 1, wherein said switch in each of said controllable switching devices comprises a MOS transistor.

11. A converter as in claim 1, wherein said output circuit comprises a filter inductor.

12. A converter as in claim 11, wherein said filter inductor and a magnetizing inductance of said coupled inductor are capable of storing sufficient energy to discharge capacitors of said controllable switching devices prior to closing of corresponding switches in said controllable switching devices, such that said switches switch from a non-conducting state to a conducting state under a zero voltage condition.

13. A pulse-width modulated converter comprising:

a bridge comprising first and second legs, each of said first and second legs comprising a first and a second switch;

a coupled inductor including a first winding and a second winding coupled by a magnetic core;

a first blocking capacitor coupling said first winding to said first leg of said bridge;

a second blocking capacitor coupling said second winding to said second leg of said bridge;

a transformer having a primary winding and a secondary winding, said primary winding being coupled to both said first and second windings of said coupled inductor; and an output circuit coupled to said secondary winding of said transformer to provide an output voltage.

14. A converter as in claim 13, wherein said primary winding of said transformer is coupled between said coupled inductor and ground.

15. A converter as in claim 13, wherein said output circuit comprises a filter inductor.

16. A converter as in claim 13, wherein said output circuit comprises a full-wave rectifier.

17. A converter as in claim 13, wherein said output circuit further comprises a RCD-snubber circuit.

18. A converter as in claim 13, wherein said secondary winding of said transformer is center-tapped.

19. A converter as in claim 13, wherein said output circuit comprises a full-wave full-bridge rectifier.

20. A converter as in claim 13, wherein said output circuit comprises a current-doubler.

21. A converter as in claim 13, wherein said first and second windings of said coupled inductor has a turns ratio of 1.

22. A method for providing a pulse-width modulated converter operating over wide load and input voltage ranges, comprising:

providing a bridge for receiving an input voltage, said bridge having first and second legs, each of said first and second legs comprising a first and a second switch;

coupling to said first and second legs of said bridge a coupled inductor including a first winding and a second winding coupled by a magnetic core, said first winding being coupled to said first leg of said bridge via a first blocking capacitor, and said second winding being coupled to said second leg of said bridge via a second blocking capacitor;

coupling to both said first and second windings of said coupled inductor a primary winding of a transformer; and coupling an output circuit to a secondary winding of said transformer to provide an output voltage.

23. A method as in claim 22, wherein said first and second windings of said coupled inductor are provided a turns ratio of 1.

24. A method as in claim 22, wherein said primary winding of said transformer couples a terminal of said coupled inductor to ground.

25. A method as in claim 22, further comprising providing a filter inductor in said output circuit.

26. A method as in claim 22, further comprising providing a full-wave rectifier in said output circuit.

27. A method as in claim 22, further comprising providing a RCD-snubber circuit in said output circuit.

28. A method as in claim 22, further comprising providing as said secondary winding of said transformer a center-tapped winding.

29. A method as in claim 22, wherein said output circuit is provided a full-wave full-bridge rectifier.

30. A method as in claim 22, wherein said output circuit is provided a current doubler.

* * * * *